US006961650B2

(12) United States Patent
Itoh

(10) Patent No.: US 6,961,650 B2
(45) Date of Patent: Nov. 1, 2005

(54) DATA MAP FORMING METHOD, DATA MAP FORMATION-PURPOSE INFORMATION RECORD MEDIUM FORMING METHOD AND APPARATUS

(75) Inventor: Yoshiyasu Itoh, Toyota (JP)

(73) Assignee: Toyoto Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/481,449

(22) PCT Filed: Apr. 22, 2003

(86) PCT No.: PCT/IB03/01481

§ 371 (c)(1),
(2), (4) Date: Dec. 19, 2003

(87) PCT Pub. No.: WO03/091560

PCT Pub. Date: Nov. 6, 2003

(65) Prior Publication Data

US 2004/0172212 A1 Sep. 2, 2004

(30) Foreign Application Priority Data

Apr. 23, 2002 (JP) ...................................... 2002-121302

(51) Int. Cl.[7] ......................... F02D 41/24; G06F 15/00; G06F 3/14

(52) U.S. Cl. ....................... 701/104; 701/105; 701/115; 702/127; 707/100

(58) Field of Search ................................ 123/478, 480, 123/486; 701/101–105, 115, 36; 707/100, 102, 130 R, 103 Y; 702/127

(56) References Cited

U.S. PATENT DOCUMENTS 5,575,264 A 11/1996 Barron ....................... 123/486
6,247,451 B1 6/2001 Estevenon et al. .......... 123/478
6,354,274 B1 * 3/2002 Shima et al. ............... 123/478
6,459,970 B2 * 10/2002 Goto et al. ................... 701/36
2001/0028362 A1 * 10/2001 Minezaki et al. ........... 707/100

FOREIGN PATENT DOCUMENTS

| | | |
|---|---|---|
| EP | 0 845 588 A2 | 6/1998 |
| JP | A 7-238857 | 9/1995 |
| JP | A 8-237761 | 9/1996 |
| JP | A 8-284729 | 10/1996 |
| JP | A 8-284730 | 10/1996 |
| JP | A 8-284731 | 10/1996 |
| JP | A 9-4503 | 1/1997 |
| JP | A 9-81207 | 3/1997 |
| JP | A 9-166040 | 6/1997 |
| JP | A 10-213002 | 8/1998 |
| JP | A 10-266887 | 10/1998 |
| JP | A 10-288119 | 10/1998 |
| JP | A 11-62684 | 3/1999 |
| JP | A 2001-182608 | 7/2001 |
| JP | A 2002-168140 | 6/2002 |

* cited by examiner

*Primary Examiner*—Willis R. Wolfe, Jr.
(74) *Attorney, Agent, or Firm*—Oliff & Berridge, PLC

(57) ABSTRACT

An allocation map stored in a ROM in an ECU is set corresponding to the kinds of fuel injection valves. Therefore, at the time of incorporating fuel injection valves into a diesel engine, it is possible to freely set how injection correction amount data read from a two-dimensional code by a writing device is allocated in an injection correction amount map in steps S214 and S216, separately for the individual kinds of fuel injection valves. Since the injection correction amount map in which the injection correction amount data is arranged with a distribution of density corresponding to the kinds of fuel injection valves, it is possible to change and set correction points with high degree of freedom even though the amount of data recordable in the two-dimensional code is limited. Therefore, high-precision data maps can be used separately for the individual kinds of fuel injection valves.

16 Claims, 21 Drawing Sheets

FIG. 3

[#1 CYLINDER-INJECTION CORRECTION AMOUNT MAP (μs)]

| Ixp (PRESSURE INDEX) \ Ixt (INJECTION PERIOD INDEX) | 1 | 2 | 3 | 4 |
|---|---|---|---|---|
| 1 | -96 | -69 | -69 | -69 |
| 2 | 17 | 37 | -121 | -121 |
| 3 | -6 | 52 | 99 | 99 |
| 4 | -105 | -50 | -50 | -50 |
| 5 | -35 | 33 | 33 | 33 |
| 6 | -35 | 33 | 33 | 33 |

FIG. 4

[#2 CYLINDER-INJECTION CORRECTION AMOUNT MAP (μs)]

| Ixp (PRESSURE INDEX) \ Ixt (INJECTION PERIOD INDEX) | 1 | 2 | 3 | 4 |
|---|---|---|---|---|
| 1 | -104 | -91 | -91 | -91 |
| 2 | 36 | 52 | -95 | -95 |
| 3 | 8 | 47 | 92 | 92 |
| 4 | -120 | -44 | -44 | -44 |
| 5 | -97 | 75 | 75 | 75 |
| 6 | -97 | 75 | 75 | 75 |

FIG. 5

[#3 CYLINDER-INJECTION CORRECTION AMOUNT MAP (μs)]

| Ixp (PRESSURE INDEX) \ Ixt (INJECTION PERIOD INDEX) | 1 | 2 | 3 | 4 |
|---|---|---|---|---|
| 1 | -114 | -100 | -100 | -100 |
| 2 | 7 | 31 | 105 | 105 |
| 3 | 13 | 31 | 97 | 97 |
| 4 | -113 | -81 | -81 | -81 |
| 5 | -29 | 27 | 27 | 27 |
| 6 | -29 | 27 | 27 | 27 |

FIG. 6

[#4 CYLINDER-INJECTION CORRECTION AMOUNT MAP (μs)]

| Ixp (PRESSURE INDEX) \ Ixt (INJECTION PERIOD INDEX) | 1 | 2 | 3 | 4 |
|---|---|---|---|---|
| 1 | -54 | -46 | -46 | -46 |
| 2 | 36 | 62 | -111 | -111 |
| 3 | -18 | 31 | 90 | 90 |
| 4 | -111 | -87 | -87 | -87 |
| 5 | -16 | 28 | 28 | 28 |
| 6 | -16 | 28 | 28 | 28 |

FIG. 7

[PRESSURE DATA ARRAY]

| Ixp (PRESSURE INDEX) | 1 | 2 | 3 | 4 | 5 | 6 |
|---|---|---|---|---|---|---|
| PRESSURE VALUE(MPa) | 32 | 64 | 96 | 128 | 160 | 160 |

FIG. 8

[INJECTION PERIOD DATA ARRAY (μs)]

| Ixp (PRESSURE INDEX) \ Ixt(INJECTION PERIOD INDEX) | 1 | 2 | 3 | 4 |
|---|---|---|---|---|
| 1 | 540 | 1580 | 1580 | 1580 |
| 2 | 480 | 650 | 970 | 970 |
| 3 | 450 | 600 | 850 | 850 |
| 4 | 440 | 750 | 750 | 750 |
| 5 | 430 | 650 | 650 | 650 |
| 6 | 430 | 650 | 650 | 650 |

FIG. 11

[#1]

| INDEX | DATA |
|---|---|
| 1 | A0 |
| 2 | BB |
| 3 | 11 |
| 4 | 25 |
| 5 | 87 |
| 6 | FA |
| 7 | 34 |
| 8 | 63 |
| 9 | 97 |
| 10 | CE |
| 11 | DD |
| 12 | 21 |

[#2]

| INDEX | DATA |
|---|---|
| 1 | 98 |
| 2 | A5 |
| 3 | 24 |
| 4 | 34 |
| 5 | A1 |
| 6 | 08 |
| 7 | 2F |
| 8 | 5C |
| 9 | 88 |
| 10 | D4 |
| 11 | 9F |
| 12 | 4B |

[#3]

| INDEX | DATA |
|---|---|
| 1 | 8E |
| 2 | 9C |
| 3 | 07 |
| 4 | 1F |
| 5 | 69 |
| 6 | 0D |
| 7 | 1F |
| 8 | 61 |
| 9 | 8F |
| 10 | AF |
| 11 | E3 |
| 12 | 1B |

[#4]

| INDEX | DATA |
|---|---|
| 1 | CA |
| 2 | D2 |
| 3 | 24 |
| 4 | 3E |
| 5 | 91 |
| 6 | EE |
| 7 | 1F |
| 8 | 5A |
| 9 | 6F |
| 10 | A9 |
| 11 | F0 |
| 12 | 1C |

FIG. 13

〔ALLOCATION MAP〕

| Ixp (PRESSURE INDEX) \ Ixt (INJECTION PERIOD INDEX) | 1 | 2 | 3 | 4 |
|---|---|---|---|---|
| 1 | 1 | 2 | 2 | 2 |
| 2 | 3 | 4 | 5 | 5 |
| 3 | 6 | 7 | 8 | 8 |
| 4 | 9 | 10 | 10 | 10 |
| 5 | 11 | 12 | 12 | 12 |
| 6 | 11 | 12 | 12 | 12 |

FIG. 14

〔ANOTHER TYPE OF INJECTION PERIOD DATA ARRAY (μs)〕

| Ixp (PRESSURE INDEX) \ Ixt (INJECTION PERIOD INDEX) | 1 | 2 | 3 | 4 |
|---|---|---|---|---|
| 1 | 540 | 890 | 1240 | 1580 |
| 2 | 480 | 650 | 970 | 970 |
| 3 | 450 | 850 | 850 | 850 |
| 4 | 440 | 750 | 750 | 750 |
| 5 | 650 | 650 | 650 | 650 |
| 6 | 650 | 650 | 650 | 650 |

FIG. 15

[ANOTHER TYPE OF ALLOCATION MAP]

| Ixp (PRESSURE INDEX) \ Ixt (INJECTION PERIOD INDEX) | 1 | 2 | 3 | 4 |
|---|---|---|---|---|
| 1 | 1 | 2 | 3 | 4 |
| 2 | 5 | 6 | 7 | 7 |
| 3 | 8 | 9 | 9 | 9 |
| 4 | 10 | 11 | 11 | 11 |
| 5 | 12 | 12 | 12 | 12 |
| 6 | 12 | 12 | 12 | 12 |

FIG. 16

[ANOTHER TYPE OF INJECTION PERIOD DATA ARRAY (μs)]

| Ixp (PRESSURE INDEX) \ Ixt (INJECTION PERIOD INDEX) | 1 | 2 | 3 | 4 |
|---|---|---|---|---|
| 1 | 1580 | 1580 | 1580 | 1580 |
| 2 | 480 | 970 | 970 | 970 |
| 3 | 450 | 850 | 850 | 850 |
| 4 | 440 | 610 | 750 | 750 |
| 5 | 430 | 500 | 570 | 650 |
| 6 | 430 | 500 | 570 | 650 |

FIG. 17

〔ANOTHER TYPE OF ALLOCATION MAP〕

| Ixp (PRESSURE INDEX) \ Ixt (INJECTION PERIOD INDEX) | 1 | 2 | 3 | 4 |
|---|---|---|---|---|
| 1 | 1 | 1 | 1 | 1 |
| 2 | 2 | 3 | 3 | 3 |
| 3 | 4 | 5 | 5 | 5 |
| 4 | 6 | 7 | 8 | 8 |
| 5 | 9 | 10 | 11 | 12 |
| 6 | 9 | 10 | 11 | 12 |

FIG. 18

〔ANOTHER TYPE OF PRESSURE DATA ARRAY〕

| Ixp (PRESSURE INDEX) | 1 | 2 | 3 | 4 | 5 | 6 |
|---|---|---|---|---|---|---|
| PRESSURE VALUE(MPa) | 32 | 58 | 80 | 102 | 132 | 160 |

FIG. 22

〔CORRECTION CANDIDATE POINTS-PURPOSE INJECTION PERIOD DATA ARRAY (μS)〕

| IXP \ INJECTION PERIOD CANDIDATE INDEX Kt | 1 | 2 | 3 | 4 | 5 | 6 | 7 | 8 | 9 | 10 |
|---|---|---|---|---|---|---|---|---|---|---|
| 1 | 540 | 660 | 780 | 890 | 1010 | 1120 | 1240 | 1350 | 1470 | 1580 |
| 2 | 480 | 540 | 590 | 650 | 700 | 750 | 810 | 860 | 910 | 970 |
| 3 | 450 | 490 | 550 | 600 | 640 | 680 | 710 | 760 | 800 | 850 |
| 4 | 440 | 470 | 510 | 540 | 580 | 610 | 640 | 680 | 710 | 750 |
| 5 | 430 | 450 | 470 | 500 | 520 | 550 | 570 | 600 | 620 | 650 |
| 6 | — | — | — | — | — | — | — | — | — | — |

DATA MAP FORMING METHOD, DATA MAP FORMATION-PURPOSE INFORMATION RECORD MEDIUM FORMING METHOD AND APPARATUS

FIELD OF THE INVENTION

The invention relates to a data map forming method and a data map formation-purpose information record medium forming method, and apparatuses for the methods.

BACKGROUND OF THE INVENTION

For example, in order to correct variations in the amount of fuel injected via fuel injection valves of a diesel engine, the injection durations needed for a target amount of injection corresponding to various values of fuel pressure are measured at a plurality of points beforehand with regard to each fuel injection valve. Deviations of the injection duration from that of a standard fuel injection valve are determined as correction values. The correction values are coded in a two-dimensional manner, and are then attached to fuel injection valves, which are transported to a section of assembling a diesel engine.

When fuel injection valves are mounted to the individual cylinders at the assembly section, the content of the two-dimensional code attached to each fuel injection valve is read, and the obtained correction values are arranged in the form of a map with parameters of fuel pressure and injection duration. The map is stored in a memory provided in an ECU (electronic control unit), and will be used for the fuel injection amount control of the fuel injection valves.

Performance requirements for fuel injection valves vary in accordance with the kinds of diesel engines to be assembled. In accordance with various requirements, various types of fuel injection valves having different characteristics exist. Due to such different characteristics, the correction values-based maps of different kinds of fuel injection valves may differ from one another in terms of a region where high-precision control is possible although correction points are provided at low density, and a region where if correction points are not provided at high density, a great deviation in control will result and high-precision control will be impossible.

Considering cases where the region where correction points may be provided at low density and the region where correction points need to be provided at high density vary depending on kinds of fuel injection valves, it is necessary to provide correction points with high density in the whole spaces of fuel pressure and injection duration.

However, the information record medium attachable to a fuel injection valve, such as a two-dimensional code or the like, has only a limited capacity for recording information, and therefore cannot store a great number of correction values corresponding to high-density correction points so as to be applicable to all kinds of fuel injection valves.

Even if an information record medium capable of storing many correction values is available, there still is a need to measure various data and determine correction values beforehand. Furthermore, when a fuel injection valve is mounted in a diesel engine after many correction values have been stored in an information record medium, it is necessary to read many correction values from the information record medium and store them into a memory of an ECU. Therefore, there is a danger of cost increases in both apparatuses and assembling operations.

The problems stated above occur with regard to not only the fuel injection valves of diesel engines, but also the fuel injection valves of other types of engines, and occur in management and control of actions of other mechanisms, for example, correction of values detected by various sensors, and the like.

DISCLOSURE OF THE INVENTION

An object of the invention is to allow the use of high-precision data maps separately for kinds of mechanism while requiring only a small amount of data.

Means, operation and advantages of the invention will be described below.

A data map forming method in accordance with a first aspect of the invention is a method of forming a data map by reading data from an information record medium that records map formation-purpose data, and allocating the data in a map, the method being characterized in that a state of allocation of the map formation-purpose data recorded in the information record medium is made changeable in accordance with a kind of a mechanism to which the data map is applied, by allocating the map formation-purpose data recorded in the information record medium based on allocation information that is set corresponding to the kind of the mechanism.

The allocation information is set corresponding to the kind of the mechanism to which the data map is applied. Therefore, the manner of allocating map formation-purpose data recorded in the information record medium in a map can be freely set separately for the kinds of mechanisms.

Therefore, even with a small amount of data, it is possible to form a map in which data is arrayed with a distribution of density that corresponds to the kind of the mechanism. Hence, high-precision data maps can be used separately for individual kinds of mechanisms.

In the first aspect of the invention, it is possible to adopt a construction wherein the data map is formed by at least two parameters, and the allocation information is caused to correspond to the kind of the mechanism by changing a number of constituent points of one parameter of the at least two parameters which need allocation of data at each constituent point of another parameter.

Due to this construction of the allocation information, high density of data can be realized in a region where the number of constituent points of the one parameter is increased, and low density of data can be realized in a region where the number of constituent points is reduced. Therefore, even with a small amount of data, it is possible to form a data map in which the distribution of data density is arbitrarily changed corresponding to the kind of the mechanism. Hence, high-precision data maps can be used separately for the individual kinds of mechanisms.

In the aforementioned aspect, it is possible to adopt a construction wherein the information record medium records a fuel injection correction amount, and the mechanism is a fuel injection valve of a diesel engine, and the data map is a fuel injection correction amount map whose parameters are a fuel pressure and an injection period, and wherein the allocation information is caused to correspond to the kind of the mechanism by changing the number of constituent points of one parameter of the fuel pressure and the injection period which need allocation of the fuel injection correction amount at each constituent point of the other parameter.

Thus, in the case where the mechanism is a diesel engine fuel injection valve, the allocation information for forming a fuel injection correction amount map is caused to correspond to the kind of fuel injection valve by changing the number of constituent points which need allocation of the fuel injection correction amount as described above.

Therefore, even with a small amount of fuel injection correction amount data, it is possible to form a fuel injection correction amount map in which the distribution of density of fuel injection correction amount data is arbitrarily changed corresponding to the kind of the fuel injection valve. Hence, high-precision fuel injection correction amount maps can be used separately for individual kinds of fuel injection valves.

In the aforementioned aspect, it is possible to adopt a construction wherein the allocation information sets, as a position of allocation of the fuel injection correction amount, a standard measurement point selected based on a pattern of a deviation between a standard value and a measured value obtained by measuring a state of injection at pre-set standard points specifically to the kind of the fuel injection valve.

The allocation information can be formed as described above. Due to the use of the allocation information formed separately for individual kinds of fuel injection valves, it becomes possible to form a fuel injection correction amount map in which the distribution of density of fuel injection correction amount is arbitrarily changed corresponding to the kind of the fuel injection valve even if the amount of fuel injection correction amount data is small. Therefore, high-precision fuel injection correction amount maps can be used separately for individual kinds of fuel injection valves.

In the above-described aspect and embodiments, the information record medium may be a two-dimensional code.

In general, information record media such as two-dimensional codes have only limited capacities for recording information, and therefore are not able to store many correction values corresponding to high-density correction points so as to conform to all kinds of fuel injection valves. However, the above-described constructions of the invention allow formation of a map in which data is arranged with distribution of density corresponding to the kind of mechanism despite the small amount of data recordable in a two-dimensional code, and therefore make it possible to use high-precision data maps separately for individual kinds of mechanisms.

A data map formation-purpose information record medium forming method in accordance with a second aspect of the invention is a method of recording data for forming a data map for managing operation of a mechanism into an information record medium, the method being characterized in that, at measurement points based on measurement point information that is set corresponding to a kind of a mechanism to which the data map is applied, a state of operation of the mechanism is measured, and map formation-purpose data is set based on a result of measurement of the state of operation, and the map formation-purpose data is recorded in the information record medium in an array based on arrayal information that sets a relationship between the measurement points and a data array.

Since the measurement point information is set corresponding to the kind of a mechanism to which the data map is applied, the measurement points needed for determining map formation-purpose data recorded in the information record medium can be freely set separately for individual kinds of mechanisms. Therefore, even though maps to be formed vary depending on the kinds of mechanisms in terms of the region in which high-density data is needed and the region in which low-density data suffices, it is not necessary to provide a great number of measurement points in order to form a map.

Therefore, the required amount of data stored in an array in the information record medium based on the arrayal information can be reduced. If the information record medium is used as described above in conjunction with the first aspect of the invention or its embodiments or modifications, it is possible to form a map in which data is arrayed with distribution of density corresponding to the kind of mechanism despite small amount of data. Therefore, high-precision data maps can be used separately for individual kinds of mechanisms.

In the second aspect of the invention, it is possible to adopt a construction wherein the data map is formed by at least two parameters, and the measurement point information sets measurement points corresponding to the kind of the mechanism by changing a number of constituent points of one parameter of the at least two parameters which need the measurement at each constituent point of another parameter.

Due to this construction of measurement point information, high-density measurement can be realized in a region that has a great number of constituent points of the parameter, and low-density measurement can be realized in a region that has a small number of constituent points of the parameter. Thus, by arbitrarily changing the distribution of density of measurement points corresponding to the kind of mechanism, it becomes possible to acquire map formation-purpose data that highly precisely corresponds to individual kinds of mechanisms despite small amount of data. Therefore, the use of the information record medium that records the map formation-purpose data allows formation of a map in which data is arrayed with a distribution of density corresponding to the kind of mechanism despite small amount of data. Hence, high-precision data maps can be used separately for individual kinds of mechanisms.

In the above-described aspect, it is possible to adopt a construction wherein the mechanism is a fuel injection valve of a diesel engine, and the data map is a fuel injection correction amount map whose parameters are a fuel pressure and an injection period, and wherein the measurement point information sets measurement points corresponding to the kind of the mechanism by changing the number of constituent points of one parameter of the fuel pressure and the injection period which need the measurement at each constituent point of the other parameter.

Thus, if the mechanism is a diesel engine fuel injection valves, the number of constituent points that need the measurement based on the measurement point information is changed as described above. By changing the distribution of density of measurement points corresponding to the kind of mechanism in this manner, it becomes possible to acquire map formation-purpose data that highly precisely corresponds to individual kinds of fuel injection valves despite small amount of fuel injection correction amount data. Therefore, the use of the information record medium that records the map formation-purpose data allows formation of a fuel injection correction amount map in which data is arrayed with a distribution of density corresponding to the kind of fuel injection valve despite small amount of data. Hence, high-precision fuel injection correction amount maps can be used separately for individual kinds of fuel injection valves.

In the above-described aspect, it is possible to adopt a construction wherein the measurement point information sets, as the measurement points, standard measurement points selected based on a pattern of a deviation between a standard value and a measured value obtained by measuring a state of injection at pre-set standard points specifically to the kind of the fuel injection valve.

The measurement point information can be formed as described above. By using the measurement point information formed separately for individual kinds of mechanisms, it becomes possible to perform measurement with distribution of density changed arbitrarily corresponding to the kind of fuel injection valve. Therefore, the map formation-purpose data acquired by the measurement and stored in the information record medium allows formation of a fuel injection correction amount map in which data is arrayed with distribution of density corresponding to the kind of fuel injection valve even though the amount of map formation-purpose data is small. Hence, high-precision fuel injection correction amount maps can be used separately for individual kinds of fuel injection valves.

In the second aspect of the invention or the modification thereof, the information record medium may be a two-dimensional code.

In general, information record media such as two-dimensional codes have only limited capacities for recording information, and therefore are not able to store many correction values corresponding to high-density correction points so as to conform to all kinds of fuel injection valves. However, the data obtained through the use of the measurement point information as described above in conjunction with the second aspect of the invention or its modifications allows formation of a map in which data is arranged with distribution of density corresponding to the kind of mechanism despite the small amount of data that can be recorded in a two-dimensional code, and therefore makes it possible to use high-precision data maps separately for individual kinds of mechanisms.

In the first aspect and its modifications, it is possible to adopt a construction wherein the allocation information indicates substantially the same information content as the arrayal information described in any one the second aspect and its modifications, and the information record medium is formed by a data map formation-purpose information record medium forming method as defined in any one of the second aspect and its modifications.

The measurement point information associated with the arrayal information indicates the distribution of measurement points so that measured values that allow formation of a data map in which data is arrayed with distribution of density corresponding to the kind of mechanism can be obtained. The arrayal information determines an array of map formation-purpose data obtained at the distributed measurement points on the information record medium.

The allocation information is information for forming high-precision data maps separately for individual kinds of mechanisms by allocating data from the information record medium in a map with distribution of density corresponding to the kind of mechanism. Therefore, the allocation information and the arrayal information have a two-sides-of-the-same-coin relationship. Therefore, if the two sets of information have substantially the same information content, the data map forming method in accordance with the first aspect or any one of its modifications can be performed by using the information record medium formed by the data map formation-purpose information record medium forming method of the second aspect or any one of its modifications.

Therefore, even though the amount of data is small, a map in which data is arrayed with distribution of density corresponding to the kind of mechanism can be formed. Hence, high-precision data maps can be used separately for individual kinds of mechanisms.

A data map forming apparatus in accordance with a third aspect of the invention is an apparatus for forming a data map by reading data from an information record medium that records map formation-purpose data, and allocating the data in a map, the apparatus comprising: medium data reading means for reading the map formation-purpose data recorded in the information record medium; allocation information storage means for storing allocation information that is set corresponding to a kind of a mechanism to which the data map is applied; and data allocation means for forming the data map corresponding to the kind of the mechanism by allocating map formation-purpose data read by the medium data reading means based on the allocation information stored in the allocation information storage means.

The allocation information stored in the allocation information storage means is set corresponding to the kind of a mechanism to which the data map is applied. Therefore, the manner in which the data allocation means allocates the map formation-purpose data read from the information record medium by the medium data reading means in a map can be freely set separately for the kinds of mechanisms.

Therefore, even with small amount of data, it is possible to form a map in which data is arrayed with distribution of density corresponding to the kind of mechanism. Hence, high-precision data maps can be used separately for individual kinds of mechanisms.

In the third aspect of the invention, it is possible to adopt a construction wherein the data map is formed by at least two parameters, and the allocation information stored in the allocation information storage means is caused to correspond to the kind of the mechanism due to a construction in which a number of constituent points of one parameter of the at least two parameters which need allocation of data at each constituent point of another parameter is changed.

Due to this construction of the allocation information, the data allocation means can realize high density of data in a region where the number of constituent points of the one parameter is great, and low density of data in a region where the number of constituent points is small. Therefore, owing to the content of allocation information stored in the allocation information storage means, it becomes possible to form a data map in which the distribution of data density is arbitrarily changed corresponding to the kind of the mechanism despite small amount of data. Hence, high-precision data maps can be used separately for individual kinds of mechanisms even if the amount of data is small.

In the above-described aspect, it is possible to adopt a construction wherein the information record medium records a fuel injection correction amount, and the mechanism is a fuel injection valve of a diesel engine, and the data map is a fuel injection correction amount map whose parameters are a fuel pressure and an injection period, and wherein the allocation information stored in the allocation information storage means is caused to correspond to the kind of the mechanism due to a construction in which the number of constituent points of one parameter of the fuel pressure and the injection period which need allocation of the fuel injection correction amount at each constituent point of the other parameter is changed.

Thus, in the case where the mechanism is a diesel engine fuel injection valve, the allocation information stored in the allocation information storage means is caused to correspond to the kinds of fuel injection valves by changing the number of constituent points which need allocation of the fuel injection correction amount as described above.

Therefore, owing to the content of allocation information stored in the allocation information storage means, it becomes possible to form a fuel injection correction amount map in which the distribution of density of the fuel injection correction amount is arbitrarily changed corresponding to the kind of fuel injection valve despite small amount of fuel injection correction amount data. Hence, high-precision fuel injection correction amount data maps can be used separately for individual kinds of fuel injection valves even if the amount of fuel injection correction amount data is small.

In the above-described aspect, it is possible to adopt a construction wherein the allocation information stored in the allocation information storage means is obtained by using, as a position of allocation of the fuel injection correction amount, a standard measurement point selected based on a pattern of a deviation between a standard value and a measured value obtained by measuring a state of injection at pre-set standard points specifically to the kind of the fuel injection valve.

The allocation information can be formed as described above. Due to the use of the allocation information formed separately for individual kinds of fuel injection valves, it becomes possible for the data allocation means to form a fuel injection correction amount map in which the distribution of density of fuel injection correction amount is arbitrarily changed corresponding to the kind of the fuel injection valve even if the amount of fuel injection correction amount data is small. Therefore, high-precision fuel injection correction amount maps can be used separately for individual kinds of fuel injection valves despite small amount of fuel injection correction amount data.

In the third aspect or any one of its modifications, the information record medium may be a two-dimensional code.

In general, information record media such as two-dimensional codes have only limited capacities for recording information, and therefore are not able to store many correction values corresponding to high-density correction points so as to conform to all kinds of fuel injection valves. However, the above-described construction of the third aspect or any one of its modifications allows formation of a map in which data is arranged with distribution of density corresponding to the kind of mechanism despite the small amount of data recordable in a two-dimensional code, and therefore makes it possible to use high-precision data maps separately for individual kinds of mechanisms.

A data map formation-purpose information record medium forming apparatus in accordance with a fourth aspect of the invention is an apparatus for recording data for forming a data map for managing operation of a mechanism into an information record medium, the apparatus comprising: measurement point information storage means for storing measurement point information that is set corresponding to a kind of a mechanism to which the data map is applied; measurement means for measuring a state of operation of the mechanism at measurement points based on the measurement point information stored in the measurement point information storage means; map formation-purpose data setting means for setting map formation-purpose data based on measurement by the measurement means; and arrayal information storage means for storing arrayal information that sets a relationship between the measurement points based on the measurement point information stored in the measurement point information storage means and a data array of the map formation-purpose data set by the map formation-purpose data setting means.

The measurement point information is set corresponding to the kind of a mechanism to which the data map is applied. Therefore, measurement points can be freely set separately for individual kinds of mechanisms. Hence, even though maps to be formed vary depending on the kinds of mechanisms in terms of the region where high-density data is needed and the region where low-density data suffices, measurement at a small number of measurement points is sufficient to form a map.

Therefore, the map formation-purpose data setting means merely needs to set a small number of pieces of map formation-purpose data, and the map formation-purpose data recording means merely needs to record a small amount of data in the information record medium in accordance with the arrayal information. If the thus-recorded information record medium is used, for example, in the data map forming apparatus of the third aspect or any one of its modifications, it becomes possible to form a map in which data is arrayed with distribution of density corresponding to the kind of mechanism. Therefore, high-precision data maps can be used separately for individual kinds of mechanisms.

In the fourth aspect, it is possible to adopt a construction wherein the data map is formed by at least two parameters, and the measurement point information stored in the measurement point information storage means is caused to correspond to the kind of the mechanism due to a construction in which a number of constituent points of one parameter of the at least two parameters which need the measurement at each constituent point of another parameter is changed.

Due to this construction of the measurement point information, it becomes possible for the measurement means to perform high-density measurement in the region that has a great number of constituent points of the one parameter, and to form low-density measurement in the region that has a small number of constituent points of the parameter. Therefore, the map formation-purpose data can be stored in the information record medium by the map formation-purpose data recording means on the basis of the arrayal information, and the information record medium can be used, for example, in the data map forming apparatus of the third aspect or any one of its modifications. Thus, it becomes possible to form a map in which data is arrayed with distribution of density corresponding to the kind of mechanism even though the amount of data is small. Hence, high-precision data maps can be used separately for individual kinds of mechanisms despite small amount of data.

In the above-described aspect, it is possible to adopt a construction wherein the mechanism is a fuel injection valve of a diesel engine, and the data map is a fuel injection correction amount map whose parameters are a fuel pressure and an injection period, and wherein the measurement point information stored in the measurement point information storage means is caused to correspond to the kind of the mechanism due to a construction in which the number of constituent points of one parameter of the fuel pressure, and the injection period which need the measurement at each constituent point of the other parameter is changed.

Thus, in the case where the mechanism is a diesel engine fuel injection valve, the distribution of density of measurement points can be arbitrarily changed by changing the number of constituent points which need the measurement based on the measurement point information as described above.

Therefore, it becomes possible for the map formation-purpose data setting means to acquire map formation-purpose data that highly precisely corresponds to individual kinds of fuel injection valves even if the amount of fuel injection correction amount data is small. Hence, the map formation-purpose data can be stored in the information record medium by the map formation-purpose recording means on the basis of the arrayal information, and the information record medium can be used, for example, in the data map forming apparatus of the third aspect or any one of its modifications. Therefore, despite small amount of data, it becomes possible to form a fuel injection correction amount map in which data is arrayed with distribution of density corresponding to the kind of fuel injection valve, and to use high-precision fuel injection correction amount maps separately for individual kinds of fuel injection valves.

In the above-described aspect, it is possible to adopt a construction wherein the measurement point information stored in the measurement point information storage means sets, as the measurement points, standard measurement points selected based on a pattern of a deviation between a standard value and a measured value obtained by measuring a state of injection at pre-set standard points specifically to the kind of the fuel injection valve.

The measurement point information can be formed as described above. Due to the measurement through the use of the measurement point information formed separately for individual kinds of mechanisms, the measurement means is able to perform measurement with distribution of density changed arbitrarily corresponding to the kind of fuel injection valves. Then, on the basis of the measurement, the map formation-purpose setting means sets map formation-purpose data. The map formation-purpose data recording means then records the map formation-purpose data in the information record medium on the basis of the arrayal information. Therefore, the map formation-purpose data stored in the information record medium can be used, for example, in the data map forming apparatus of the third aspect or any one of its modifications. Thus, it becomes possible to form a fuel injection correction amount map in which data is arrayed with distribution of density corresponding to the kind of fuel injection valve even though the amount of data is small. Hence, high-precision fuel injection correction amount maps can be used separately for the individual kinds of fuel injection valves despite small amount of data.

In the fourth aspect or any one of its modifications, the information record medium may be a two-dimensional code.

In general, information record media such as two-dimensional codes have only limited capacities for recording information, and therefore are not able to store many correction values corresponding to high-density correction points so as to conform to all kinds of fuel injection valves. However, the data obtained by using the measurement point information as described above in conjunction with the fourth aspect or any one of its modifications allows formation of a map in which data is arranged with distribution of density corresponding to the kind of mechanism despite the small amount of data recordable in a two-dimensional code, and therefore makes it possible to use high-precision data maps separately for individual kinds of mechanisms.

In the third aspect or any one of its modifications, it is possible to adopt a construction wherein the allocation information stored in the allocation information storage means indicates substantially the same information content as the arrayal information stored in the arrayal information storage means mentioned in the fourth aspect or any one of its modifications, and the information record medium is formed by a data map formation-purpose information record medium forming apparatus as defined in the fourth aspect or any one of its modifications.

The measurement point information stored in the measurement point information storage means indicates distribution of measurement points so that a data map in which data is arrayed with distribution of density corresponding to the kind of mechanism can be obtained. The arrayal information stored in the arrayal information storage means determines an array of map formation-purpose data obtained at the distributed measurement points on the information record medium.

The allocation information is information for forming high-precision data maps separately for individual kinds of mechanisms by allocating data from the information record medium in a map with distribution of density corresponding to the kind of mechanism. Therefore, the allocation information and the arrayal information have a two-sides-of-the-same-coin relationship. Therefore, if the two sets of information have substantially the same information content, a data map can be formed by the data map forming apparatus in accordance with the third aspect or any one of its modifications can by using the information record medium formed by the data map formation-purpose information record medium forming apparatus of the fourth aspect or any one of its modifications.

Therefore, even though the amount of data is small, a map in which data is arrayed with distribution of density corresponding to the kind of mechanism can be formed. Hence, high-precision data maps can be used separately for individual kinds of mechanisms.

BRIEF DESCRIPTION OF THE DRAWINGS

FIG. 3 is an illustration of the construction of a #1 cylinder injection correction amount map for use in the fuel injection amount control process.

FIG. 4 is an illustration of the construction of a #2 cylinder injection correction amount map for use in the fuel injection amount control process.

FIG. 5 is an illustration of the construction of a #3 cylinder injection correction amount map for use in the fuel injection amount control process.

FIG. 6 is an illustration of the construction of a #4 cylinder injection correction amount map for use in the fuel injection amount control process.

FIG. 7 is an illustration of the construction of a pressure data array indicating correspondence to the indexes of the aforementioned injection correction amount maps.

FIG. 8 is an illustration of the construction of an injection period data array indicating correspondence to the indexes of the aforementioned injection correction amount maps.

FIG. 11 is an illustration of the construction of a data array in a two-dimensional code in the first embodiment.

FIG. 13 is an illustration of the construction of an allocation map used in the ROM-writing process.

FIG. 14 is an illustration of the construction of an injection period data array indicating correspondence to the indexes of injection correction amount maps to be used for a different type of fuel injection valves.

FIG. 15 is an illustration of the construction of an allocation map to be used for a different type of fuel injection valves.

FIG. 16 is an illustration of the construction of an injection period data array indicating correspondence to the indexes of injection correction amount maps to be used for a different type of fuel injection valves.

FIG. 17 is an illustration of the construction of an allocation map to be used for a different type of fuel injection valves.

FIG. 18 is an illustration of a pressure data array indicating correspondence to the indexes of injection correction amount maps to be used for a different type of fuel injection valves.

FIG. 22 is an illustrating the construction of a correction candidate points-purpose injection period data array for use in a third embodiment.

DETAILED DESCRIPTION OF THE PREFERRED EMBODIMENTS

[First Embodiment]

Figure 1:
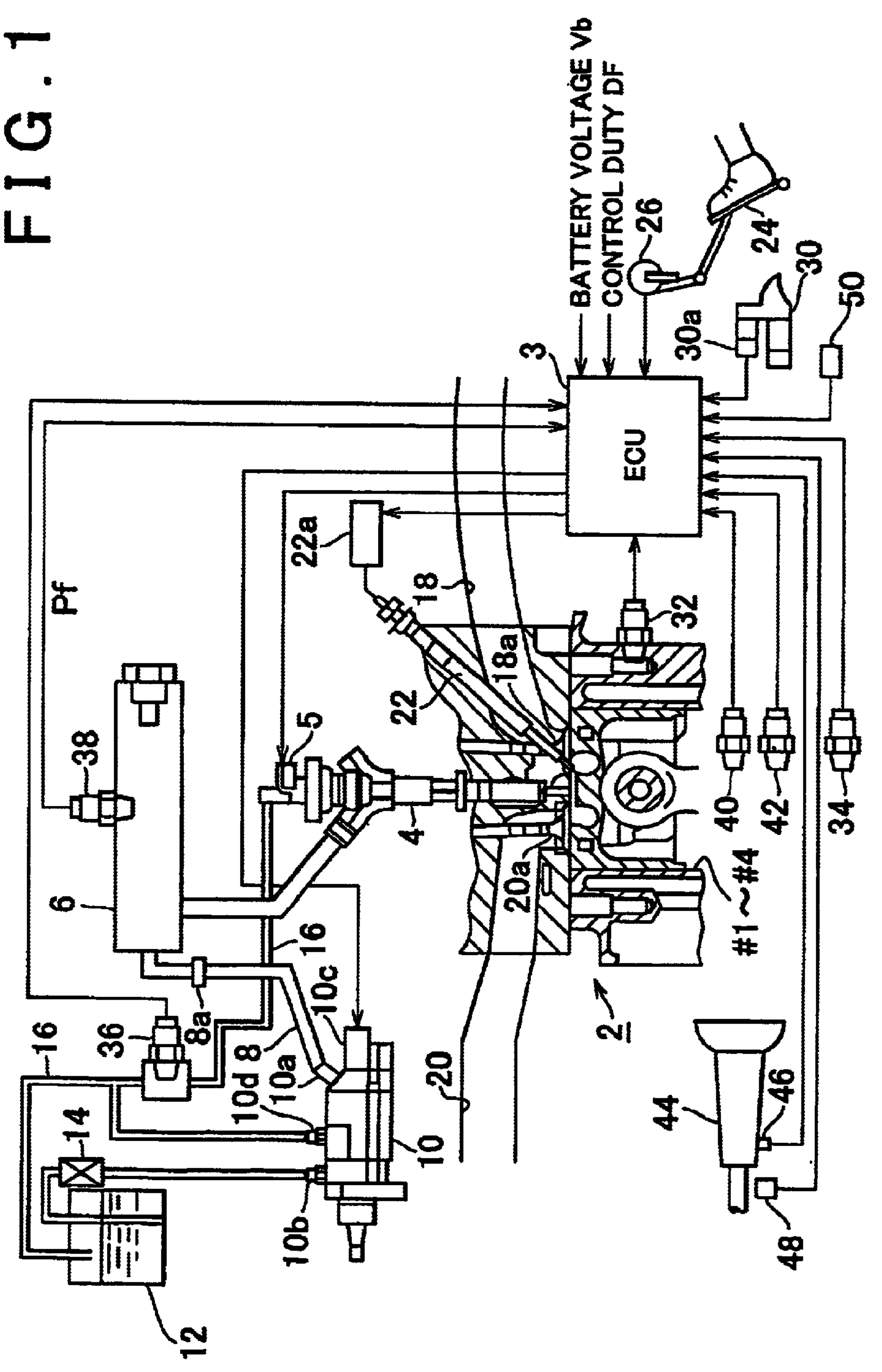
FIG. 1 is a schematic diagram illustrating a pressure accumulator type diesel engine and its control system in accordance with a first embodiment.

FIG. 1 is a schematic diagram illustrating a pressure accumulator type diesel engine (common rail type diesel engine) 2 and a control system thereof. The pressure accumulator type diesel engine 2 is installed in a vehicle as a motor vehicle-purpose engine. A ROM provided in an electronic control unit (ECU) 3 that forms a control system of the diesel engine 2 stores injection correction amount maps (FIGS. 3 to 6) prepared by a ROM writing process (FIG. 12) described below.

The diesel engine 2 will first be described. The diesel engine 2 has a plurality of cylinders (four cylinders in this embodiment although only one cylinder is shown in FIG. 1) #1, #2, #3, #4. A combustion chamber of each cylinder #1 to #4 is provided with a fuel injection valve 4 (corresponding to valves 4*a*–4*d* mentioned below). Fuel injection from the fuel injection valves 4 into the cylinders #1–#4 of the diesel engine 2 is controlled in accordance with the on and off states of corresponding injection control-purpose electromagnetic valves 5.

The fuel injection valves 4 are connected to a common rail 6 that is a pressure accumulator pipe provided for all the cylinders. Fuel in the common rail 6 is injected into one of the cylinders #1–#4 via a corresponding fuel injection valve 4 while a corresponding injection control-purpose electromagnetic valve 5 is open, that is, during an injection period. In the common rail 6, relatively high fuel pressure for fuel injection is accumulated. To realize this pressure accumulation, the common rail 6 is connected to an ejection port 10*a* of a supply pump 10 via a supply pipe 8. A check valve 8*a* is provided in an intermediate portion of the supply pipe 8. The provision of the check valve 8*a* allows supply of fuel from the supply pump 10 to the common rail 6, and prevents reverse flow of fuel from the common rail 6 to the supply pump 10.

The supply pump 10 is connected to a fuel tank 12 via a suction port 10*b*. A filter 14 is provided between the suction port 10*b* of the supply pump 10 and the fuel tank 12. The supply pump 10 draws in fuel from the fuel tank 12 via the filter 14. Furthermore, through the use of a cam (not shown) that operates synchronously with revolution of the diesel engine 2, the supply pump 10 causes a plunger to reciprocate so as to raise the fuel pressure to a required injection pressure. Such a high fuel pressure is supplied to the common rail 6.

A pressure control valve 10*c* is provided near the ejection port 10*a* of the supply pump 10. The pressure control valve 10*c* is provided for controlling the pressure of fuel ejected from the ejection port 10*a* toward the common rail 6. When the pressure control valve 10*c* is opened, the surplus fuel that is not ejected from the ejection port 10*a* is returned to the fuel tank 12 from a return port 10*d* of the supply pump 10 via a return pipe 16.

An intake passage 18 and an exhaust passage 20 are connected to the combustion chambers of the cylinders #1–#4 of the diesel engine 2. The intake passage 18 is provided with a throttle valve (not shown). By adjusting the degree of opening of the throttle valve in accordance with the state of operation of the diesel engine 2, the amount of flow of intake air introduced into each combustion chamber is adjusted.

A glow plug 22 is disposed in the combustion chamber of each cylinder #1–#4 of the diesel engine 2. Each glow plug 22 becomes red hot upon supply of electric current via a glow relay 22*a* immediately prior to a startup of the diesel engine 2. Then, a portion of fuel spray is blown to the glow plug. Thus, the glow plugs 22 form a startup assistant device that promotes ignition and combustion of fuel.

The diesel engine 2 is provided with various sensors and the like described below. These sensors detect the state of operation of the diesel engine 2 in the first embodiment. That is, as shown in FIG. 1, an accelerator sensor 26 for detecting the accelerator operation amount ACCPF is provided near an accelerator pedal 24. The diesel engine 2 is provided with a starter 30 for starting up the diesel engine 2. The starter 30 has a starter switch 30*a* that detects the state of operation of the starter 30. A cylinder block of the diesel engine 2 is provided with a water temperature sensor 32 for detecting the temperature of engine-cooling water (cooling water temperature THW). An oil pan (not shown) is provided with an oil temperature sensor 34 that detects the temperature THO of engine oil. The return pipe 16 is provided with a fuel temperature sensor 36 for detecting the fuel temperature THF. The common rail 6 is provided with a fuel pressure sensor 38 for detecting the fuel pressure Pf in the common rail 6. An NE sensor 40 is provided near a pulser (not shown) that is provided on a crankshaft (not shown) of the diesel engine 2. Rotation of the crankshaft is transferred to a camshaft (not shown) that is provided for opening and closing intake valves 18*a* and exhaust valves 20*a*, via a timing belt and the like. Setting is made such that the camshaft rotates at half the rotation speed of the crankshaft. A cylinder discrimination sensor 42 is provided near a pulser (not shown) provided on the camshaft. In the first embodiment, the engine revolution speed NE, the crank angle CA, and the top dead center (TDC) of the first cylinder #1 are computed on the basis of pulse signals from the NE sensor 40 and the cylinder discrimination sensor 42. A transmission 44 is provided with a shift position sensor 46 for detecting the state of shift of the transmission 44. A vehicle speed sensor 48 is provided at a side of an output shaft of the transmission 44 for detecting the vehicle speed SPD from the rotation speed of the output shaft. An air conditioner (not shown) driven by output from the diesel engine 2 is provided. An air conditioner switch 50 for commanding the driving of the air conditioner is provided.

The aforementioned ECU 3 is provided for various controls of the diesel engine 2. The ECU 3 executes various processes for controlling the diesel engine 2, for example, a fuel injection amount control based on adjustment of the open valve duration of the fuel injection valves 4, a glow plug electrification control, etc. The ECU 3 is made up mainly of a microcomputer that has a central processing unit (CPU), a read-only memory (ROM) in which various programs, injection correction amount maps and the like are pre-stored, a random access memory (RAM) for temporarily storing results of operations of the CPU and the like, a backup RAM for storing operation results, pre-stored data and the like, a timer counter, input interfaces, output interfaces, etc.

The accelerator sensor 26, the water temperature sensor 32, the oil temperature sensor 34, the fuel temperature sensor 36, the fuel pressure sensor 38, etc: are connected to input interfaces of the ECU 3 via buffers, multiplexers, A/D converters (none of which is shown), or the like. The NE sensor 40, the cylinder discrimination sensor 42, the vehicle speed sensor 48, etc. are connected to input interfaces of the ECU 3 via waveform shaper circuits (not shown). The starter switch 30*a*, the shift position sensor 46, the air conditioner switch 50, etc. are directly connected to input interfaces of the ECU 3. Furthermore, a battery voltage VB, an alternator control duty DF, etc., are input to the ECU 3, and the values thereof are read.

The CPU reads signals from the various sensors, switches and the like via the input interfaces. The electromagnetic valves 5, the pressure control valve 10*c*, the glow relay 22*a*, etc. are connected to output interfaces of the ECU 3 via drive circuits. The CPU performs control operations based on the input values read in via the input interfaces, and controls the electromagnetic valves 5, the pressure control valve 10*c*, the glow relay 22*a*, etc. via the output interfaces. Therefore, the amount of fuel injection is highly accurately adjusted in accordance with the state of operation, and is injected from the fuel injection valves 4, as described below. Furthermore, the heat generation by the glow relay 22*a* at the time of engine startup or the like is performed in accordance with the state of operation.

Figure 2:
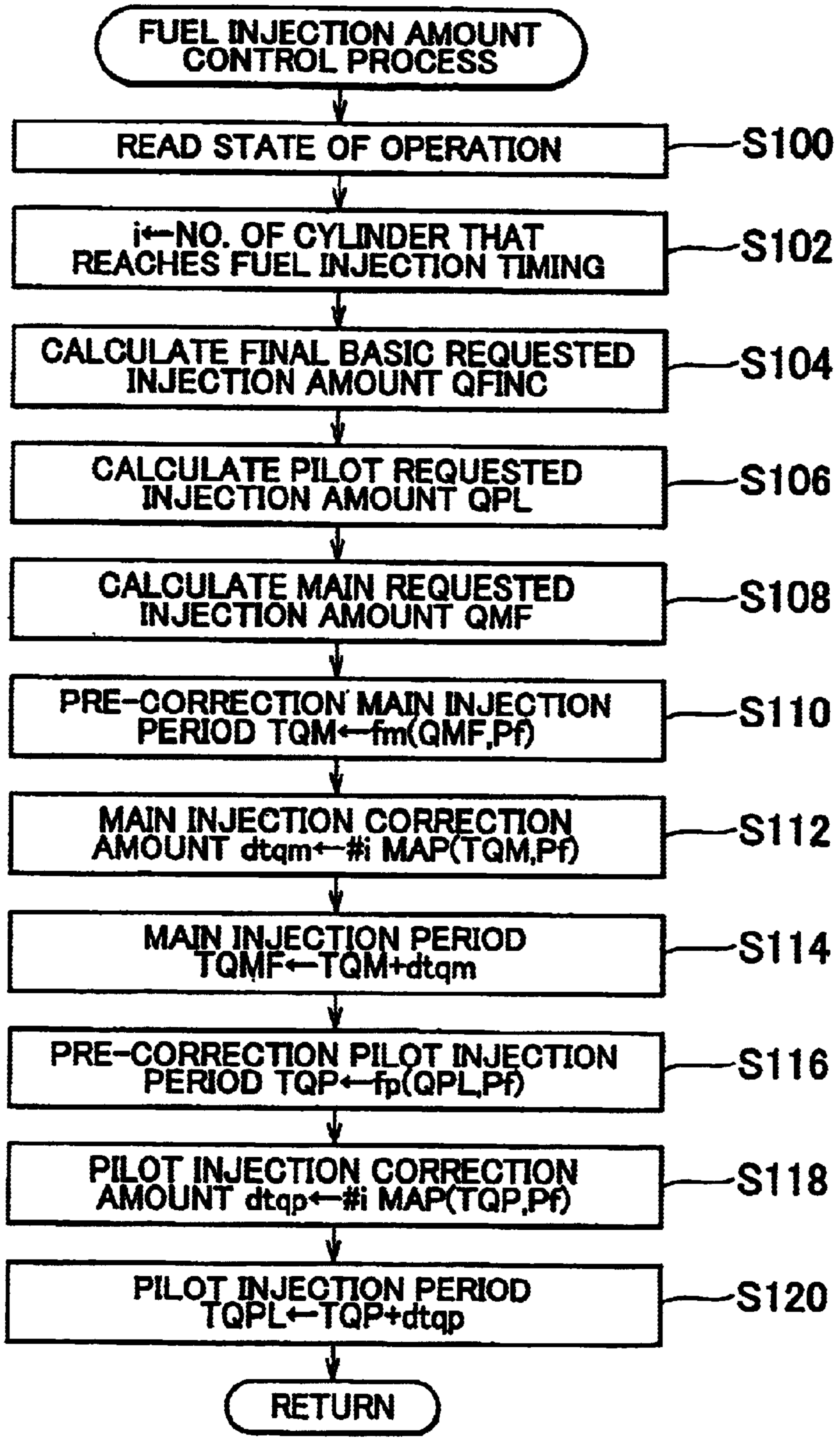
FIG. 2 is a flowchart illustrating a fuel injection amount control process executed by an ECU in the first embodiment.

Next described will be a fuel injection amount control process executed by the ECU 3 in the embodiment. FIG. 2 illustrates the fuel injection amount control process. This process is executed by an interrupt at every fixed crank angle (every explosion stroke). Steps in the flowchart corresponding to individual process steps are referred to as "S".

When this process starts, the state of operation of the diesel engine 2 is read via the aforementioned sensors and the like (S100). The cylinder number (#) of the cylinder that reaches the fuel injection timing based on the present execution of the process is set in avariant provided in a memory (S102). A final basic injection amount QFINC is calculated (S104) by executing a calculation process based on the state of operation of the diesel engine 2 read in step S100.

As for the process of calculating the final basic injection amount QFINC, during idling, the amount of fuel injection is calculated so as to increase or decrease so that a target idle revolution speed is realized. Therefore, necessary reflection can be made in the final basic injection amount QFINC. During occasions other than the idling operation, the amount of fuel injection is calculated so as to increase or decrease so that torque is output in accordance with the driver's instruction via the accelerator operation amount ACCPF, taking the engine revolution speed NE and the like into consideration. Therefore, necessary reflection can be made in the final basic injection amount QFINC.

Next, a pilot request injection amount QPL is calculated on the basis of the state of operation of the diesel engine 2 (S106). Then, a main request injection amount QMF is calculated (S108) by subtracting the pilot request injection amount QPL from the final basic injection amount QFINC, that is, "QFINC−QPL".

A pre-correction main injection period TQM is calculated (S110) by using a map or a function on the basis of the main request injection amount QMF calculated as described above and the fuel pressure Pf detected by the fuel pressure sensor 38.

Subsequently, a main injection correction amount dtqm regarding the fuel injection valve 4 of the #i cylinder is calculated with reference to a map on the basis of the pre-correction main injection period TQM and the fuel pressure Pf (S112). This calculation is performed as described below, by using an injection correction amount map provided for the concerned cylinder among the maps of the #1–#4 cylinders indicated in FIGS. 3 to 6.

The constructions of the injection correction amount maps indicated in FIGS. 3 to 6 will be described below. The injection correction amount maps of FIGS. 3 to 6 are stored in the form of two-dimensional arrays in the ROM of the ECU 3. A first index Ixp is a pressure index, and a second index Ixt is an injection period index. As for the first index Ixp, indexes "1" to "6" exist, and correspond to fuel pressure values MPa as shown in a one-dimensional array in FIG. 7. The one dimensional array of FIG. 7 is also stored in the ROM of the ECU 3.

As for the second index Ixt with respect to the first index Ixp, indexes "1" to "4" exist, and correspond to injection period lengths (μs) as shown in a two-dimensional array in FIG. 8. The two-dimensional array of FIG. 8 is also stored in the ROM of the ECU 3.

For example, if i=1, the injection correction amount map of the #1 cylinder shown in FIG. 3 is used to calculate a main injection correction amount dtqm. First, on the basis of the fuel pressure Pf measured by the fuel pressure sensor 38, two first indexes Ixp1, Ixp2 of fuel pressure values that are adjacent on the lower and higher sides of the pressure are extracted from the first indexes Ixp. In correspondence to the two first indexes Ixp1, Ixp2, on the basis of the pre-correction main injection period TQM, four second indexes Ixt11, Ixt12, Ixt21, Ixt22 of injection periods that are adjacent on the shorter and longer sides of the injection period are extracted from the second indexes Ixt.

Figure 9:
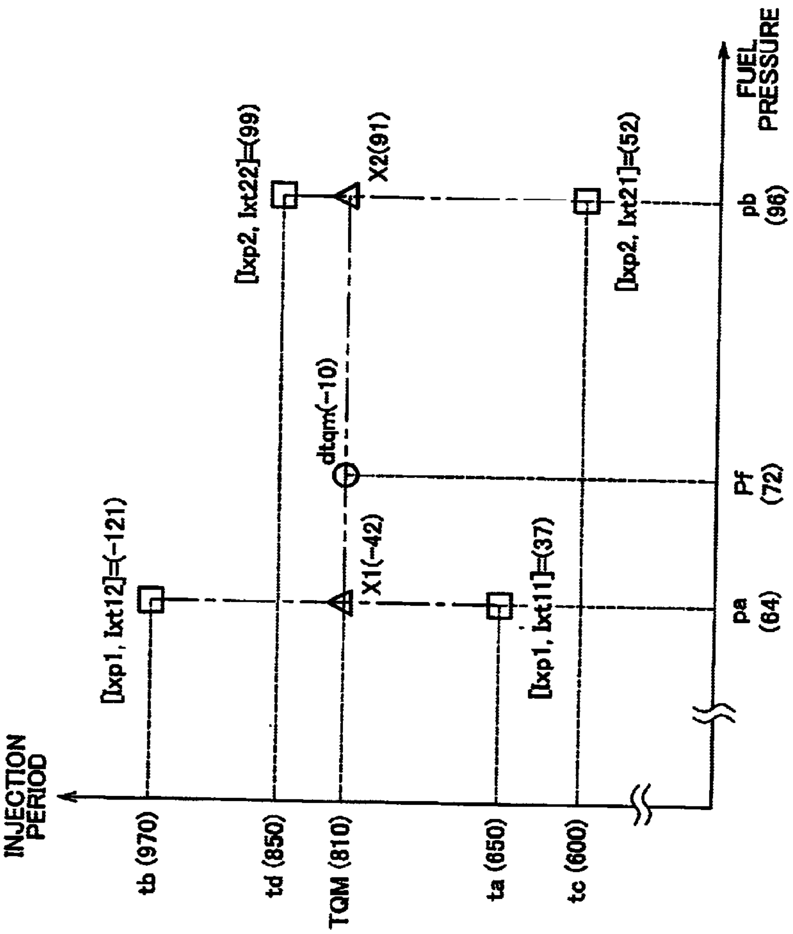
FIG. 9 is an illustration of the interpolation calculation based on the injection correction amount maps.

The states of arrangement of the indexes are indicated in FIG. 9. In FIG. 9, marking "O" indicates a position that indicates the presently determined fuel pressure Pf and the pre-correction main injection period TQM, and markings "positions where the extracted indexes apply, that is, [Ixp1, Ixt11], [Ixp1, Ixt12], [Ixp2, Ixt21], [Ixp2, Ixp22]. It is assumed, as for example, that the fuel pressure Pf=72 Mpa, and the pre-correction main injection period TQM=810 μm. The position of Pf=72 Mpa is between the first indexes Ixp="2" and Ixp="3" in FIG. 3. The position of TQM=810 μs is between the second indexes Ixt="2" and Ixt="3" for the first index Ixp="2", and between the second indexes Ixt="2" and Ixt="3" for the first index Ixp="3". In FIG. 3, parenthesized numeric values indicate specific values of the injection correction amount.

On the side of the first index Ixp1, a first interpolated correction amount X1 (marking ρ) corresponding to the pre-correction main injection period TQM is calculated from the map values of the second indexes Ixt11, Ixt12 by interpolation. For example, the first interpolated correction amount X1 is calculated as in Expression 1.

[Math. 1]

$$X1 \leftarrow \{(db-da)/(tb-ta)\}(TQM-ta)+da \qquad \text{[Exp. 1]}$$

In Expression 1, ta is the injection period at the second index Ixp11, and tb is the injection period at the second index Ixp12. Furthermore, da is the injection correction amount at the second index Ixt11 (which is the #1 cylinder injection correction amount=37 μs shown in FIG. 3), and db is the injection correction amount at the second index Ixt12 (which is the #1 cylinder injection correction amount=−121 μs in FIG. 3).

Likewise, on the side of the first index Ixp2, a first interpolated correction amount X2 (marking ρ) corresponding to the pre-correction main injection period TQM is calculated from the map values of the second indexes Ixt21, Ixt22 by interpolation. That is, the first interpolated correction amount X2 is calculated as in Expression 2.

[Math. 2]

$$X2 \leftarrow \{(dd-dc)/(td-tc)\}(TQM-tc)+dc \qquad \text{[Exp. 2]}$$

In Expression 2, tc is the injection period at the second index Ixt21, and td is the injection period at the second index Ixt22. Furthermore, dc is the injection correction amount at the second index Ixt21 (which is the #1 cylinder injection correction amount=52 μs shown in FIG. 3), and dd is the injection correction amount at the second index Ixt22 (which is the #1 cylinder injection correction amount=99 μs in FIG. 3).

Using the two first interpolated correction amounts X1, X2 calculated as described above, interpolation calculation is performed to determine a main injection correction amount dtqm that is an interpolated correction amount corresponding to the present fuel pressure Pf. For example, the main injection correction amount dtqm is calculated as in Expression 3.

[Math. 3]

$$dtqm \leftarrow \{(X2-X1)/(pb-pa)\}(Pf-pa)+X1 \qquad \text{[Exp. 3]}$$

Assuming that Pf=72 Mpa and TQM=810 μs as mentioned above, the aforementioned calculations provide X1=−42 μs, X2=91 μs, and dtqm =−10 μs.

In the example of FIG. 9, there are two second indexes Ixt for each one of the first indexes Ixp1, Ixp2. However, if there exists only one adjacent second index Ixt, the interpolated correction amounts X1, X2 are directly set at the value of an injection correction amount corresponding to the only one second index Ixt. Furthermore, if there is only one adjacent second index Ixt for two first indexes Ixp1 and Ixp2, the main injection correction amount dtqm is directly set at the value of an injection correction amount corresponding to the only one second index Ixt.

After the main injection correction amount dtqm is determined in step S112, a main injection period TQMF is calculated by correcting the pre-correction main injection period TQM as in Expression 4 (S114).

[Math. 4]

$$TQMF \leftarrow TQM+dtqm \qquad \text{[Exp. 4]}$$

Subsequently, on the basis of the pilot request injection amount QPL calculated in step S106 and the fuel pressure Pf detected by the fuel pressure sensor 38, a pre-correction pilot injection period TQP is calculated by using a map or a function (S116).

Subsequently, on the basis of the pre-correction pilot injection period TQP and the fuel pressure Pf, a pilot injection correction amount dtqp regarding the fuel injection valve 4 of the #1 cylinder is calculated with reference to the aforementioned injection correction amount map (FIGS. 3 to 6) (S118). This calculation is performed substantially in the same manner as in the above-described calculation of the main injection correction amount dtqm, by using the pre-correction pilot injection period TQP instead of the pre-correction main injection period TQM.

After the pilot injection correction amount dtqp is determined as described above, a pilot injection period TQPL is calculated by correcting the pre-correction pilot injection period TQP as in Expression 5 (S120).

[Math. 5]

$$TQPL \leftarrow TQP+dtqp \qquad \text{[5]}$$

Then, the process temporarily ends. By repeating the fuel injection amount control process using the injection correction amount maps (FIGS. 3 to 6), high-precision adjustment of the fuel injection amount in accordance with the variations of the amounts of fuel injected from the fuel injection valves 4 of the cylinders can be realized.

Next described will be a process of forming an injection correction amount map (FIGS. 3 to 6) on the ROM of the ECU 3. The writing into the ROM of the ECU 3 (in reality, an EPROM, an EEPROM, a flash memory, etc., which are writable, are used) is performed when fuel injection valves 4 are attached to the cylinders of the diesel engine 2.

Figure 10:
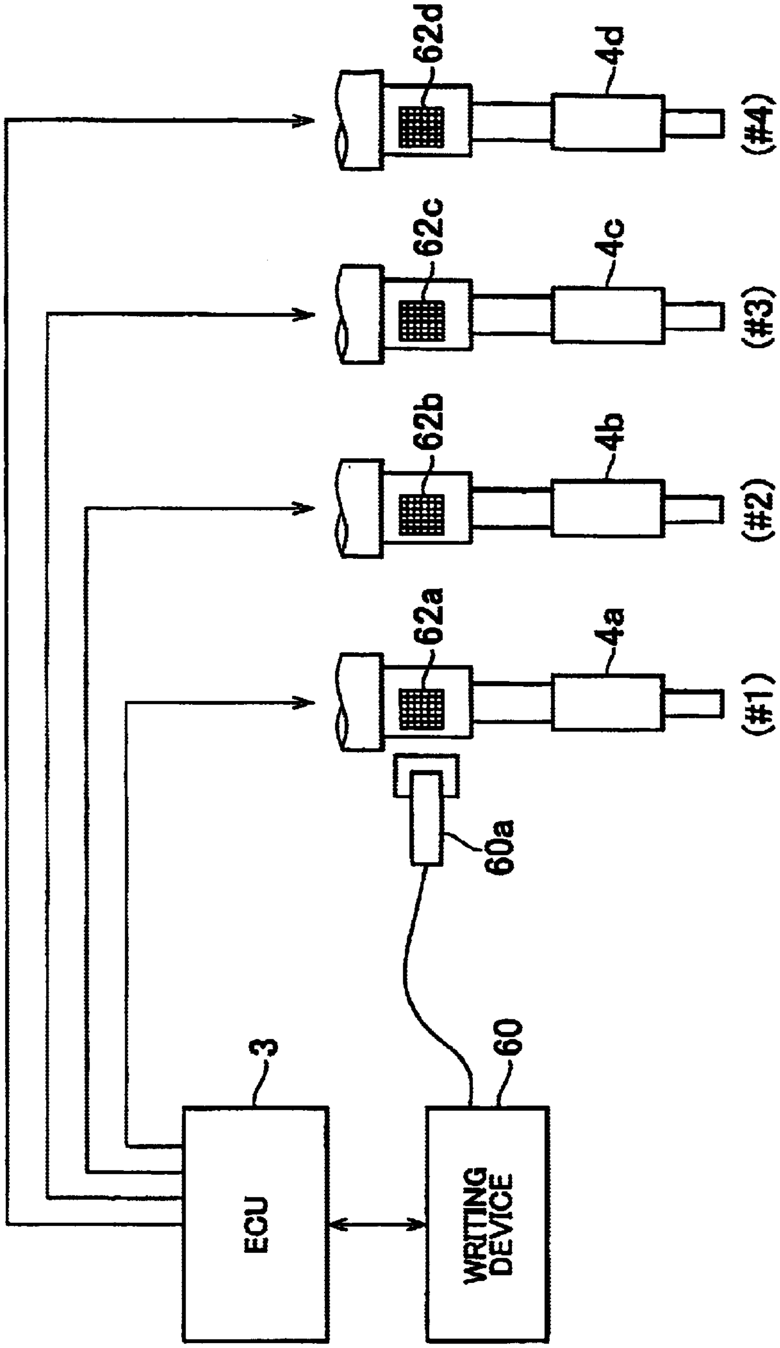
FIG. 10 is a schematic diagram illustrating the construction of an injection correction amount map forming system in the first embodiment.

FIG. 10 is a schematic illustration of the construction of an injection correction amount map forming system that is used when a fuel injection valve 4 (4*a*, 4*b*, 4*c*, 4*d*) is mounted. It is assumed herein that the fuel injection valve 4*a* is mounted to the #1 cylinder, and the fuel injection valve 4*b* is mounted to the #2 cylinder, and the fuel injection valve 4*c* is mounted to the #3 cylinder, and the fuel injection valve 4*d* is mounted to the #4 cylinder.

By the time of mounting the fuel injection valves 4*a* to 4*d*, a writing device 60 has been attached to the ECU 3. The fuel injection valves 4*a* to 4*d* are provided with two dimensional codes 62*a*, 62*b*, 62*c*, 62*d* printed on paper seals attached to the corresponding valves.

In each one of the two-dimensional codes 62*a* to 62*d* attached to the fuel injection valves 4*a* to 4*d* of the #1–#4 cylinders, an injection correction amount data array of 12 pieces of one-byte data as indicated in FIG. 11 is recorded. In the data arrays, variations of the fuel injection periods of the fuel injection valves 4*a* to 4*d* measured at the fuel pressures and the injection periods in the cells in FIG. 8 other than the hatched cells are arranged in the order of indexes appearing in an allocation map of FIG. 13 described below. In FIG. 11, the values are expressed in a hexadecimal numbering system in order to indicate that each data is a one-byte data. However, the numbers in this system are signed hexadecimal numbers, and therefore are able to represent the decimal numbers in the range of "−128 to 127". Furthermore, although not shown, each of the two-dimensional codes 62*a* to 62*d* includes a model code of the diesel engine 2 to which the fuel injection valves 4*a* to 4*d* are attached. Owing to the model code, it is possible to determine the kind of fuel injection valves to be mounted.

After an assembling operator notifies the writing device 60 that an operation is performed on the #1 cylinder by key entry or by using a two-dimensional code reader 60*a*, the assembling operator operates the two-dimensional code reader 60*a* to read the content of the two-dimensional code 62*a* attached to the fuel injection valve 4*a* that is about to be amounted or has been mounted to the #1 cylinder. In response, the writing device 60 transmits the thus-read model code and 12 pieces of injection correction amount data as the data for the #1 cylinder to the ECU 3 so that the data will be written into the ROM of the ECU 3.

Figure 12:
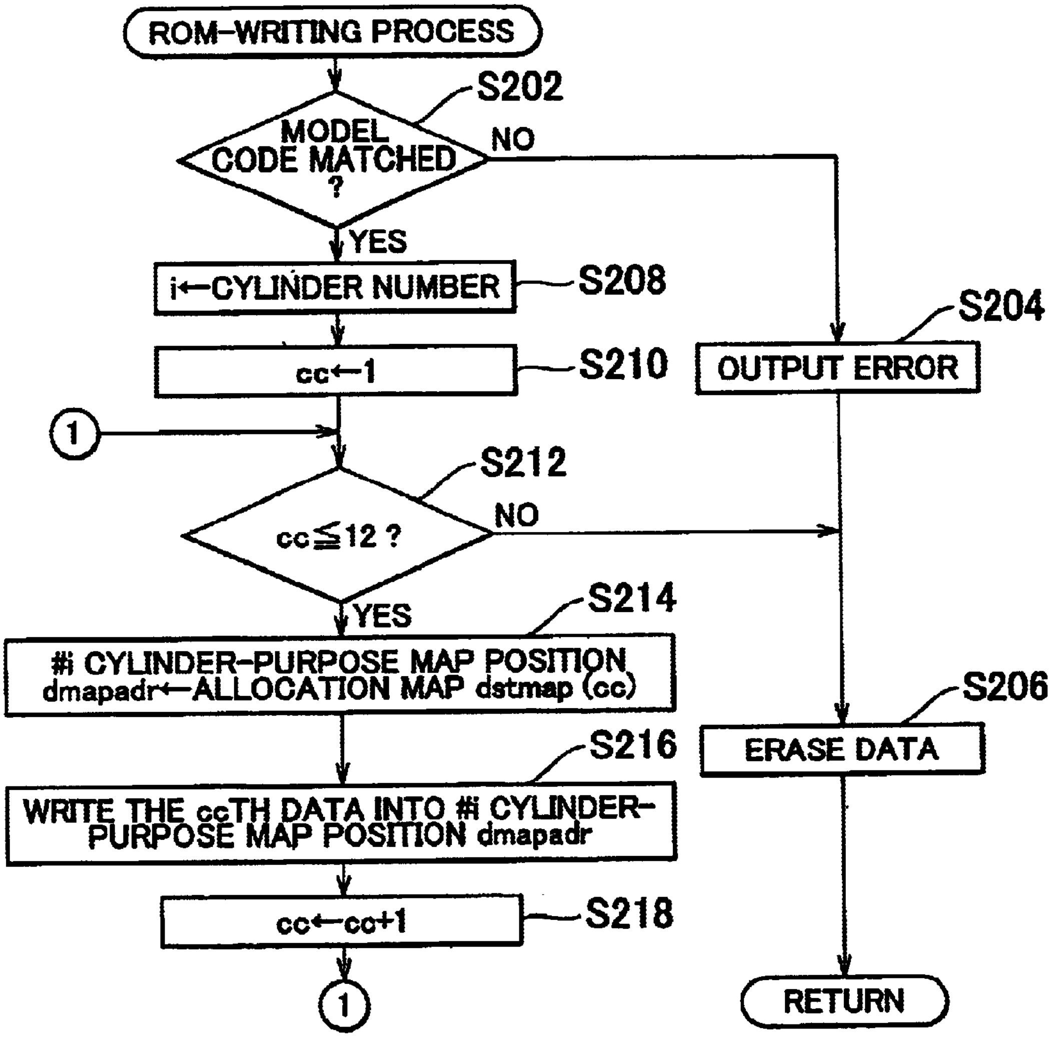
FIG. 12 is a flowchart illustrating a ROM-writing process executed by the ECU in the first embodiment.

As a result, the ECU 3 executes a ROM-writing process illustrated in FIG. 12 by using a ROM-writing function provided within the ECU 3.

The ROM-writing process of FIG. 12 will be described below. This process is executed if the writing device 60 is connected to the ECU 3, and inputs data to the ECU 3.

Initially, upon receiving from the writing device 60 the data indicating the #1 cylinder and the data acquired by reading the content of the two-dimensional code 62*a* attached to the fuel injection valve 4*a* mounted to the #1 cylinder, the ECU 3 stores the data into a buffer provided in the RAM. In response, the ROM-writing process (FIG. 12) starts. First, by checking the series of data stored in the buffer, it is determined whether the model code recorded in the data corresponds to the diesel engine 2 (S202). That is, since the model code of the diesel engine 2 is recorded beforehand in the ROM of the ECU 3, it is determined whether the model code received from the writing device 60 matches the pre-recorded model code.

If the model code does not match ("NO" at S202), it turns out that the fuel injection valve 4*a* is not for the diesel engine 2. Therefore, an error output is made (S204) in order to notify the writing device 60 that the fuel injection valve 4*a* is not appropriate. On the side of the writing device 60, a warning about the unmatched model code is given to the assembling operator, for example, via a display, an indicator lamp, etc.

Then, the received data present in the buffer of the RAM is erased (S206), and the process ends until the next data reception.

Conversely, if the model code matches ("YES" at S202), the cylinder number in the received data is input to a variant i set in the RAM (S208). Then, "1" is set in a counter cc (S210). Subsequently, it is determined whether the value of the counter cc is less than or equal to "12" (S212). During an early period, cc=1 (<12) ("YES" at S212). Therefore, on the basis of the value of the counter cc, a data arrangement position in the #i cylinder-purpose injection correction amount map (hereinafter, referred to as "map position") dmapadr is computed with reference to the allocation map of FIG. 13 (S214).

The allocation map shown in FIG. 13 is pre-stored in the ROM of the ECU 3. The hatched portion in the map in FIG. 13 will be described later. The allocation map determines patterns of arranging the 12 pieces of injection correction amount data (shown in FIG. 11) recorded in the two-dimensional codes 62*a* to 62*d* in empty injection correction amount maps provided for the #i cylinders in writable areas in the ROM. This allocation map has been designed so as to reflect the characteristics of the fuel injection valves 4 used in the individual models of the diesel engines 2. For the diesel engine 2 of this embodiment, the allocation map defines a pattern as shown in FIG. 13.

Since the allocation map is designed to distribute data shown in FIG. 11 so as to form the aforementioned injection correction amount maps (FIGS. 3 to 6), the allocation map has numbers "1" to "12" that are arranged in the two-dimensional array defined by the same number of first indexes Ixp and the same number of second indexes Ixt as in the injection correction amount maps (FIGS. 3 to 6). The numbers "1" to "12" indicate the indexes of the 12 pieces of injection correction amount data recorded in the two-dimensional codes 62*a* to 62*d* shown in FIG. 11.

During an initial period, cc=1, and therefore, it turns out that there is only one map position dmapadr in FIG. 13 at the first index Ixp=1 and the second index Ixt=1.

Then, the initial data is written into the same map position dmapadr on the empty injection correction amount map provided for the #1 cylinder. In this case, "A0" ("−96" in decimal) at the index=1 in the two-dimensional code 62*a* for the #1 cylinder shown in FIG. 11 is written. That is, "−96" is given at the first index Ixp=1 and the second index Ixt=1 as shown in FIG. 3.

Subsequently, the counter cc is incremented (S218), and it is determined whether the value of the counter cc is less than or equal to "12" (S212). Since cc=2 ("YES" at S212), the allocation map of FIG. 13 is searched for map positions dmapadr with "2" (S214). As a result, it turns out that there are three map positions dmapadr with "2" at the first index Ixp=1 and the second index Ixt=2, 3, 4. Then, the second data is written into the same map positions dmapadr (three positions) on the empty injection correction amount map provided for the #1 cylinder (S216). In this case, "BB" ("−69" in decimal) at the index=2 in the two-dimensional code 62*a* for the #1 cylinder shown in FIG. 11 is written. That is, "−69" is given at the first index Ixp=1 and the second index Ixt=2, 3, 4 as shown in FIG. 3.

Subsequently, the counter cc is incremented to "3" (S218). After affirmative determination "YES" is made at step S212, the allocation map of FIG. 13 is searched for map positions dmapadr with "3" (S214). As a result, it turns out that there is one map position dmapadr with "3" at the first index Ixp=2 and the second index Ixt=1. Then, the third data is written into the same map position dmapadr (one position) on the empty injection correction amount map provided for the #1 cylinder (S216). In this case, "11" ("17" in decimal) at the index=3 in the #1 cylinder-purposed two-dimensional code 62*a* of FIG. 11 is written. That is, "17" is given at the first index Ixp=2 and the second index Ixt=1 as shown in FIG. 3.

Then, in the case of cc=4, there is one map position dmapadr at the first index Ixp=2 and the second index Ixt=2. Therefore, "25" ("37" in decimal) at the index=4 in the #1 cylinder-purposed code in FIG. 11 is written into the same map position dmapadr (one position) on the empty injection correction amount map provided for the #1 cylinder.

Likewise, in the cases of cc=5 to 12, processes are executed as described above. Thus, the injection correction amounts shown in the #1 cylinder code in FIG. 11 are allocated in the empty injection correction amount map for the #1 cylinder in accordance with the allocation map of FIG. 13, so that the fuel correction amount map shown in FIG. 3 is completed.

After completion of data allocation in the #1 cylinder fuel correction amount map (FIG. 3) at cc=12 (S216), the increment at step S218 provides cc=13. Therefore, negative determination "NO" is made at step 211, and the received data is erased from the buffer (S206). After that, the process ends.

Subsequently, the assembling operator operates the two-dimensional code reader 60*a* to read the two-dimensional code 62*b* attached to the fuel injection valve 4*b* corresponding to the #2 cylinder, so that the ROM-writing process starts again. In this case, using the same allocation map (FIG. 13), the 12 pieces of injection correction amount data shown in the table of code #2 of FIG. 11 are distributed in an empty injection correction amount map provided for the #2 cylinder. Thus, the #2 cylinder-purpose fuel correction amount map shown in FIG. 4 is completed.

Furthermore, when the assembling operator operates the two-dimensional code reader 60*a* to read the two-dimensional code 62*c* attached to the fuel injection valve 4*c* corresponding to the #3 cylinder, the ROM-writing process starts again. In this case, using the same allocation map (FIG. 13), the 12 pieces of injection correction amount data shown in the table of code #3 of FIG. 11 are distributed in an empty injection correction amount map provided for the #3 cylinder. Thus, the #3 cylinder-purpose fuel correction amount map shown in FIG. 5 is completed.

Likewise, when the assembling operator operates the two-dimensional code reader 60*a* to read the two-dimensional code 62*d* attached to the fuel injection valve 4*d* corresponding to the #4 cylinder, the ROM-writing process starts again. In this case, using the same allocation map (FIG. 13), the 12 pieces of injection correction amount data shown in the table of code #4 of FIG. 11 are distributed in an empty injection correction amount map provided for the #4 cylinder. Thus, the #4 cylinder-purpose fuel correction amount map shown in FIG. 6 is completed.

In this manner, the fuel correction amount maps (FIGS. 3 to 6) for all the cylinders #1 to #4 are completed. After that, the maps are used in the fuel injection amount control process (FIG. 2) so that the amount of fuel injection can be adjusted at high precision.

The fuel injection valves 4*a* to 4*d* used in the diesel engine 2 tend to vary from one another in the amount of fuel injected when the fuel pressure is at intermediate level. Therefore, high-precision fuel injection amount can be achieved by increasing the number of points of correction at the first index Ixp=2, 3 (fuel pressure Pf=64 to 96 MPa). This embodiment uses the allocation map in which three points of correction are provided at the first index Ixp=2, 3 as shown in FIG. 13.

For example, a case where fuel injection valves of another type tend to vary from one another in the amount of fuel injected at low fuel pressure and require an increased number of points of correction in a low fuel pressure range will be considered. In this case, an injection period data array as shown in FIG. 14 where points of correction are densely provided in a low fuel pressure range is adopted, and an allocation map as shown in FIG. 15 is prepared. Therefore, there are four points of correction at the first index Ixp=1, three points of correction at Ixp=2, two points of correction at Ixp=3, two points of correction at Ixp=4, and one point of correction at Ixp=5. Hence, it is possible to perform a high-precision fuel injection amount control corresponding to the characteristics of the aforementioned type of fuel injection valves while using 12 points of correction as in the above-described case.

Furthermore, a case where fuel injection valves of still another type tend to vary from one another in the amount of fuel injected at high fuel pressure, and require an increased number of points of correction in a high fuel pressure range will be considered. In this case, an injection period data array as shown in FIG. 16 where points of correction are densely provided in a high fuel pressure range is adopted, and an allocation map as shown in FIG. 17 is prepared. Therefore, points of correction are provided as follows. That is, one point of correction at the first index Ixp=1, twp points of correction at Ixp=2, two points of correction at Ixp=3, three points of correction at Ixp=4, and four points of correction at Ixp=5. Hence, it is possible to perform a high-precision fuel injection amount control corresponding to the characteristics of the aforementioned type of fuel injection valves while using 12 points of correction as in the above-described case.

In the above-described examples (FIGS. 14, 15, 16, 17), the injection period data array (FIG. 8) and the allocation map (FIG. 13) are modified in accordance with the characteristics of other types of fuel injection valves. However, the pressure data array (FIG. 7) may be modified in accordance with the characteristics of the fuel injection valves (as in FIG. 18). In this manner, too, it becomes possible to perform high-precision fuel injection amount control regarding various types of fuel injection valves while using a limited number (twelve in this case) of injection correction amounts obtained from the two-dimensional codes 62*a* to 62*d*.

In the above-described construction, the injection correction amount data array of FIG. 11 corresponds to map formation-purpose data, and the two-dimensional codes 62*a* to 62*d* correspond to an information record medium, and the injection correction amount maps of FIGS. 3 to 6 correspond to a data map, and the writing device 60 equipped with the two-dimensional code reader 60*a* corresponds to medium data reading means, and the fuel injection valves 4*a* to 4*d* correspond to a mechanism. Furthermore, the allocation map of FIG. 13 corresponds to allocation information, and the ROM of the ECU 3 that stores the allocation map corresponds to allocation information storage means. The ROM-writing process of FIG. 12 corresponds to a process as data allocation means.

The above-described first embodiment achieves the following advantages.

The allocation map (FIG. 13) stored in the ROM provided in the ECU 3 is set in accordance with the kind of the fuel injection valves 4*a* to 4*d* to which the injection correction amount maps of FIGS. 3 to 6 are applied. Therefore, the manner in which the injection correction amount data read from the two-dimensional codes 62*a* to 62*d* by the writing device 60 is distributed by the ROM-writing process (FIG. 12) can be freely set separately for individual kinds of fuel injection valves.

Thus, it is possible to form an injection correction amount map in which the injection correction amount data is arranged with a density distribution that corresponds to the kind of fuel injection valves. Therefore, even though the amount of data recordable in the two-dimensional codes 62*a* to 62*d* is limited, the points of correction can be changed and set with high degree of freedom as indicated in FIGS. 7, 8, 13, 14, 15, 16, 17 and 18. Hence, high-precision data maps can be used corresponding to the kinds of fuel injection valves.

[Second Embodiment]

Figure 19:
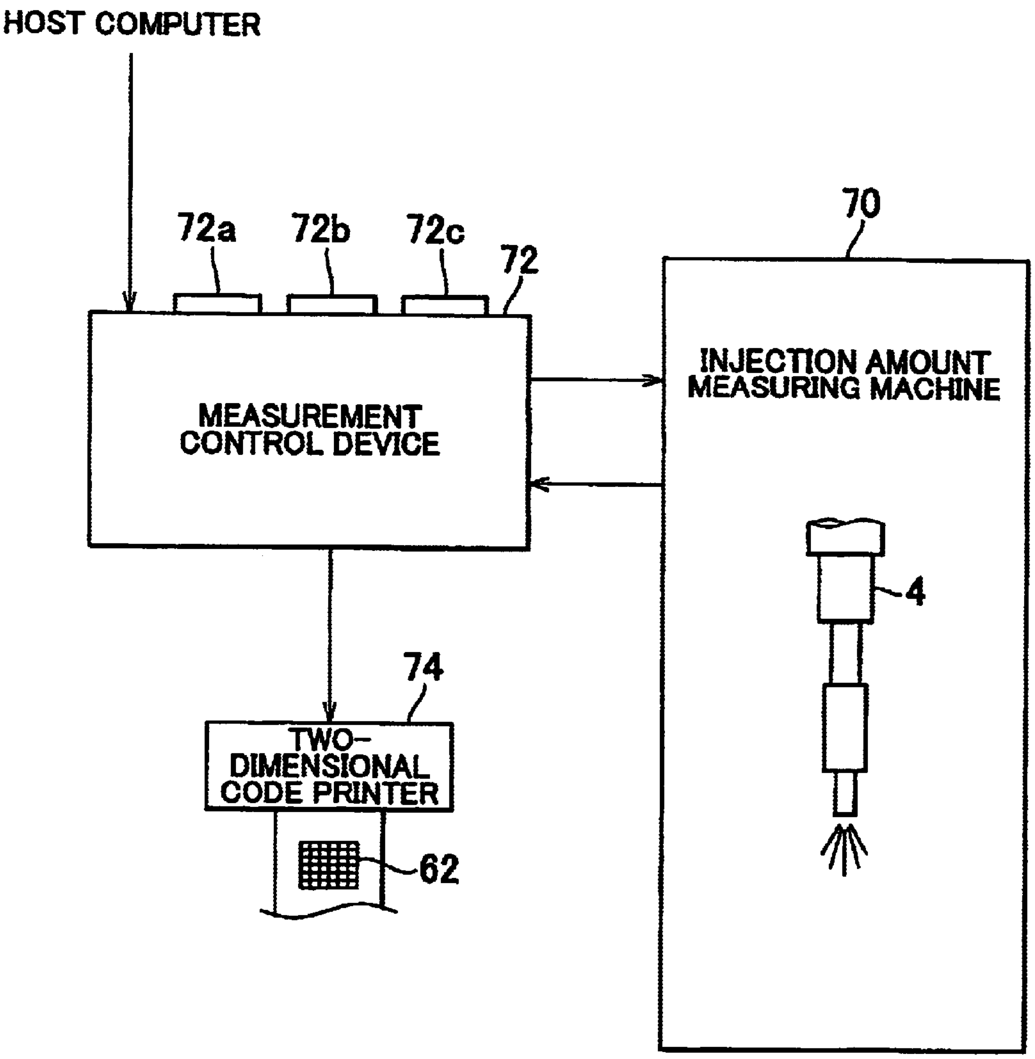
FIG. 19 is a schematic diagram illustrating the construction of an injection correction amount measuring apparatus in a second embodiment.

This embodiment illustrates an injection correction amount measuring apparatus for forming the two-dimensional codes 62*a* to 62*d* shown in FIGS. 10 and 11 in conjunction with the first embodiment. FIG. 19 is a schematic diagram illustrating the construction of the injection correction amount measuring apparatus.

The injection correction amount measuring apparatus includes an injection amount measuring machine 70, a measurement control device 72, and a two-dimensional code printer 74. The injection amount measuring machine 70 has inside thereof fuel injection valves 4. Using a fuel pressurizing device, a fuel injection valve electromagnetic valve drive device, etc., the injection amount measuring machine 70 causes fuel to be injected from the fuel injection valves 4 at a suitably set fuel pressure for a suitably set injection period. The injection amount measuring machine 70 is able to measure the amount of fuel injected from the fuel injection valves 4.

The measurement control device 72 has a key input portion 72*a*, a data reader portion 72*b* such as a floppy disk drive or the like, a display portion 72*c*, etc. The measurement control device 72 has a microcomputer as a major component. The measurement control device 72 controls the measurement by the injection amount measuring machine 70 for measurement of injection characteristic data regarding the fuel injection valves 4 in accordance with measurement control information input via the key input portion 72*a*, or from an information record medium, such as a floppy disk or the like, or from a host computer. On the basis of results of measurement, the measurement control device 72 sets fuel correction amount data. The measurement control device 72 then arranges the fuel correction amount data into a one-dimensional array based on the arrayal information, and causes the two-dimensional code printer 74 to print out the data in a two-dimensional code 62.

Figure 20:
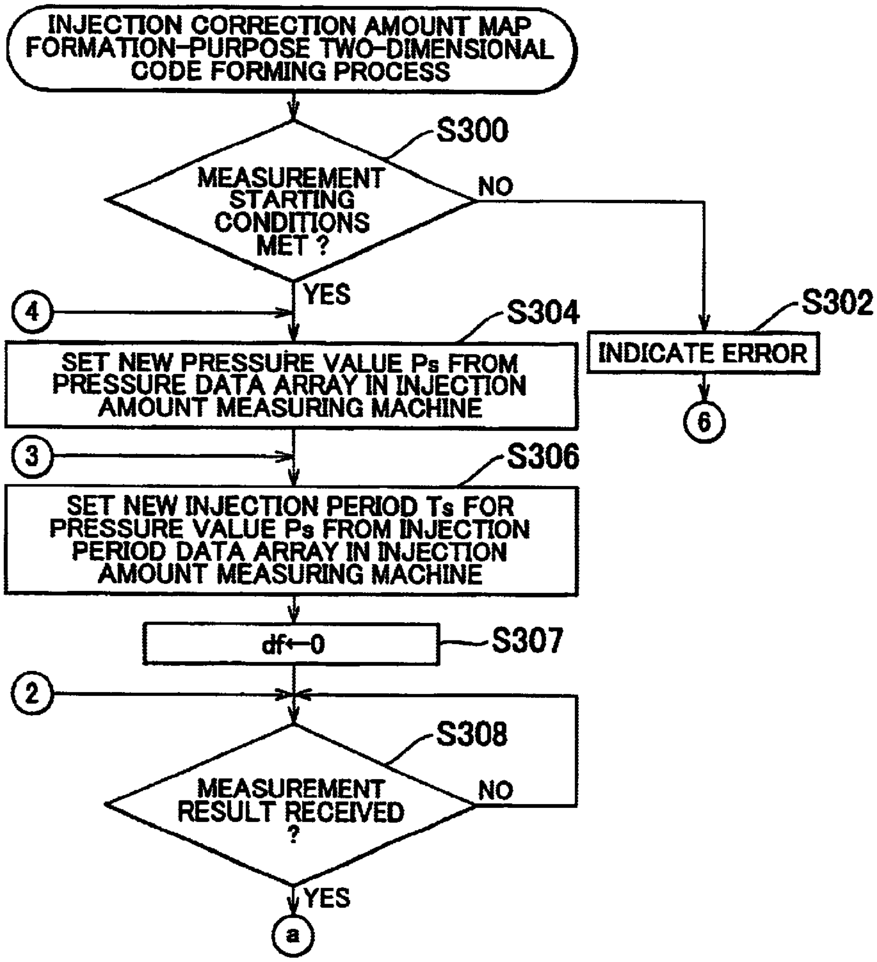
FIG. 20 is a flowchart illustrating an injection correction amount map formation-purpose two-dimensional code forming process executed by a measurement control device in the second embodiment.
Figure 21:
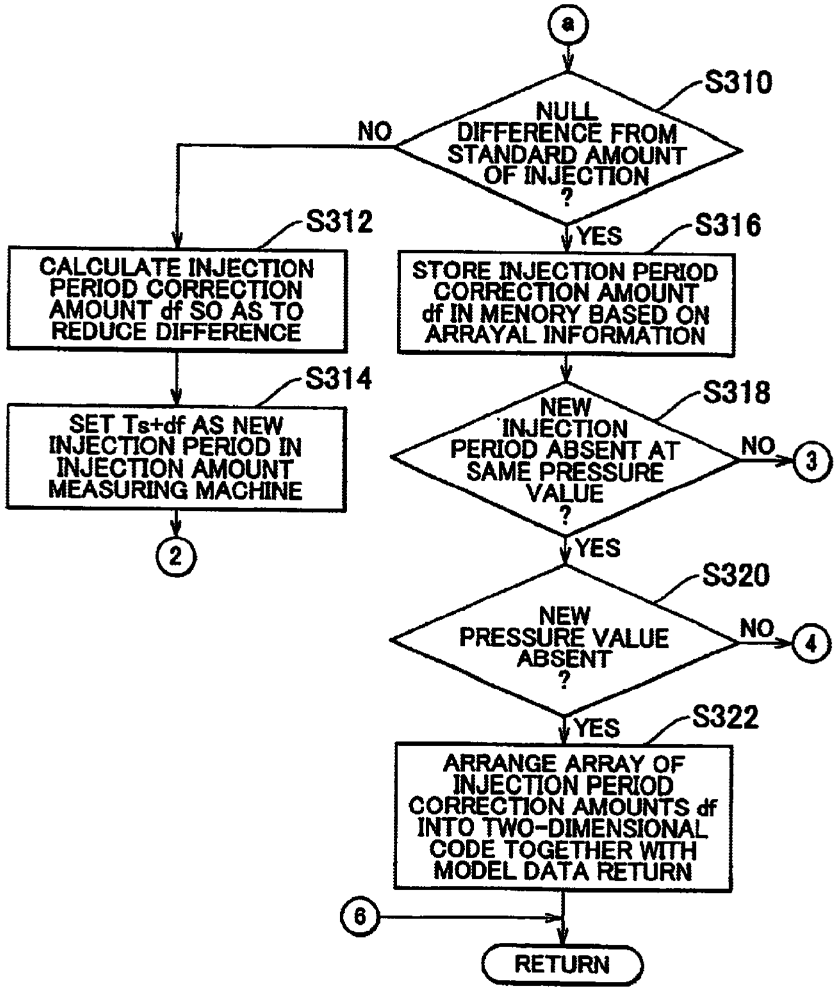
FIG. 21 is a flowchart illustrating the injection correction amount map formation-purpose two-dimensional code forming process.

FIGS. 20 and 21 illustrate a two-dimensional code forming process for the purpose of forming an injection correction amount which is executed by the measurement control device 72. This process is started upon a start command input from the key input portion 72*a*.

When the process starts, it is first determined whether a measurement starting condition is met (S300). For examples, the measurement starting condition regarding the injection amount measuring machine 70 includes a state where a fuel injection valve 4 is properly disposed, a state where fuel exists, and a state where a pressurizing pump and other mechanisms are normal. Regarding the measurement control device 72, the measurement starting condition includes a state where the measurement-purpose data is being input via the data reader portion 72*b* or from the host computer, a state where such measurement-purpose data is inputtable, etc. Examples of the measurement-purpose data include data of the pressure data array (FIG. 7), the injection period data array (FIG. 8) and the allocation map (FIG. 13) described above in conjunction with the first embodiment.

If any one of the measurement starting conditions is unmet ("NO" at S300), measurement cannot be started. Therefore, an error indication that indicates a cause of measurement failure is produced in the display portion 72*c* (S302), and then the process temporarily ends.

If all the measurement starting conditions are met ("YES" at S300), a new pressure value Ps from the pressure data array (FIG. 7) is set on the side of the injection amount measuring machine 70 (S304). Since this is the first setting operation, the pressure value "32 MPa" at the first index Ixp=1 in the pressure data array (FIG. 7) is set on the side of the injection amount measuring machine 70. Therefore, on the side of the injection amount measuring machine 70, the pressure of fuel supplied to the fuel injection valve 4 is adjusted to "32 MPa".

A new injection period Ts at the pressure value "32 MPa" (the first index Ixp=1) is extracted from the injection period data array (FIG. 8), and is set on the side of the injection amount measuring machine 70 (S306). Since this is the first extraction of the injection period at the first index Ixp=1, the injection period "540 μs" at the second index Ixt=1 is set on the side of the injection amount measuring machine 70. Therefore, on the side of the injection amount measuring machine 70, the open valve period of the fuel injection valve 4 is set at the injection period "540 μs", and the fuel injection from the fuel injection valve 4 is performed. Then, the amount of fuel actually injected is measured, and is sent to the side of the measurement control device 72.

On the side of the measurement control device 72, the below-described injection period correction amount df is set at "0" (S307). Then, the measurement control device 72 waits to receive a result of measurement (S308). Upon reception of a result of measurement ("YES" at S308), it is determined whether the measured amount of fuel injection has a difference from, that is, is substantially equal to, a pre-set amount of fuel injection provided by a standard fuel injection valve under the same condition pressure value=32 MPa" and the injection period="540 μs") (S310). As for the determination regarding the presence/absence of such difference, it is determined that there is no such difference if the measured amount of fuel injection is within such a proximate range around the amount of fuel injection provided by the standard fuel injection valve that the measured amount can be considered equal to the amount of fuel injection provided by the standard fuel injection valve. If the measured amount of fuel injection is outside the proximate range, it is determined that there is a difference between the measured amount of fuel injection and the amount of fuel injection provided by the standard fuel injection valve.

If there is such a difference ("NO" at S310), the injection period correction amount df for correcting the injection period Ts is changed in such a direction as to reduce the difference (S312). For example, if the measured amount of injection is smaller than the standard amount of fuel injection, a process of gradually increasing the injection period correction amount df is performed. If the measured amount of injection is greater than the standard amount of fuel injection, a process of gradually decreasing the injection period correction amount df is performed.

Then, a period obtained by adding the injection period correction amount df to the injection period Ts is set as a new injection period on the side of the injection amount measuring machine 70 (S314). Therefore, on the side of the injection amount measuring machine 70, the injection period "540 μs+df" is set as an open valve period of the fuel injection valve 4, and the fuel injection from the fuel injection valve 4 is performed. Then, the amount of fuel actually injected is measured, and is sent to the side of the measurement control device 72.

The measurement control device 72 returns to the mode of waiting to receive a result of measurement (S308). Upon reception of a result of measurement ("YES" at S308), it is determined whether the measured amount of fuel injection has a difference from or is substantially equal to the pre-set amount of fuel injection provided by the standard fuel injection valve under the same condition (the pressure value="32 MPa" and the injection period="540 μs") (S310).

If there still is a difference ("NO" at S310), the process of steps S312 and S314 is performed again to set an injection period changed for approach to the standard amount of fuel injection, on the side of the injection amount measuring machine 70. Then, the measurement control device 72 waits to receive a result of measurement (S308).

The process of changing and setting the injection period as described above is executed until there is no difference between the actual amount of injection and the standard amount of injection. When the actual amount of injection comes to have no difference from, that is, becomes equal to, the standard amount of injection ("YES" at S310), the injection period correction amount df is stored in a memory of the measurement control device 72 by using the allocation map (FIG. 13) as arrayal information (S316). That is, since the numerical value at the first index Ixp=1 and the second index Ixt=1 is "1" on the allocation map (FIG. 13), the injection period correction amount df is stored in the memory of the measurement control device 72 by using "1" as an index.

Next, it is determined whether a new injection period is absent corresponding to the same pressure value and the next second index Ixt with reference to the injection period data array (FIG. 8) (S318). Corresponding to "32 MPa" (the first index Ixp=1), the next second index Ixt=2 provides "1580 μs", which is a new injection period ("NO" at S318). Therefore, "1580 μs" is set as a new injection period Ts on the side of the injection amount measuring machine 70 (S306).

After setting "0" as an injection period correction amount df (S307), the measurement control device 72 waits to receive a result of measurement (S308). Upon reception of a result of measurement ("YES" at S308), it is determined whether the measured amount of fuel injection has a difference from or is substantially equal to the pre-set amount of fuel injection provided by the standard fuel injection valve under the same condition (the pressure value="32 MPa" and the injection period="1580 82 s") (S310). If there is a difference ("NO" at S310), the measurement following the changing of the value of the injection period correction amount df is executed until the actual amount of injection has no difference from the standard amount of injection (S312, S314) as described above.

When the actual amount of injection becomes substantially equal to the standard amount of injection ("YES" at S310), the injection period correction amount df is stored in a memory of the measurement control device 72 by using the allocation map (FIG. 13) as arrayal information (S316). That is, since the numerical value at the first index Ixp=1 and the second index Ixt=2 is "2" on the allocation map (FIG. 13), the injection period correction amount df is stored in the memory of the measurement control device 72 by using "2" as an index.

Next, it is determined whether a new injection period is absent corresponding to the same pressure value and the next second index Ixt with reference to the injection period data array (FIG. 8) (S318). Corresponding to "32 MPa" (the first index Ixp=1), the next second index Ixt=3 provides "1580 μs", which equals the value at the second index Ixt=2. Therefore, since a new injection period is absent ("YES" at S318), it is then determined whether a new pressure value is absent with reference to the pressure data array (FIG. 7) (S320). The next first index Ixp=2 provides "64 MPa", which is a new pressure value ("NO" at S320). Therefore, "64 MPa" is set as a new pressure value Ps on the side of the injection amount measuring machine 70 (S304).

Corresponding to "64 MPa" (first index Ixp=2), the second index Ixt=1 provides "480 μs", which is a new injection period. Therefore, "480 μs" is set as a new injection period Ts on the side of the injection amount measuring machine 70 (S306).

After setting "0" as an injection period correction amount df (S307), the measurement control device 72 waits to receive a result of measurement (S308). Upon reception of a result of measurement ("YES" at S308), it is determined whether the measured amount of fuel injection has a difference from or is substantially equal to the pre-set amount of fuel injection provided by the standard fuel injection valve under the same condition (the pressure value="64 MPa" and the injection period="480 μs") (S310). If there is a difference ("NO" at S310), the measurement following the changing of the value of the injection period correction amount df is executed until the actual amount of injection has no difference from the standard amount of injection (S312, S314) as described above.

When the actual amount of injection becomes substantially equal to the standard amount of injection ("YES" at S310), the injection period correction amount df is stored in a memory of the measurement control device 72 by using the allocation map (FIG. 13) as arrayal information (S316). That is, since the numerical value at the first index Ixp=2 and the second index Ixt=1 on the allocation map (FIG. 13) is "3", the injection period correction amount df is stored in the memory of the measurement control device 72 by using "3" as an index.

Thus, with regard to the first index Ixp=2, measurement of the amount of fuel injection is performed sequentially at the second index Ixt=1 to 3, so that the values of injection period correction amount df that eliminate differences from the standard amount of injection are stored in the memory of the measurement control device 72 by using the indexes "3, 4, 5" on the allocation map (FIG. 13).

Furthermore, with regard to the first index Ixp=3, measurement of the amount of fuel injection is performed sequentially at the second index Ixt=1 to 3, so that the values of injection period correction amount df that eliminate differences from the standard amount of injection are stored in the memory of the measurement control device 72 by using the indexes "6, 7, 8" on the allocation map (FIG. 13).

Furthermore, with regard to the first index Ixp=4, measurement of the amount of fuel injection is performed sequentially at the second index Ixt=1, 2, so that the values of injection period correction amount df that eliminate differences from the standard amount of injection are stored in the memory of the measurement control device 72 by using the indexes "9, 10" on the allocation map (FIG. 13).

Still further, with regard to the first index Ixp=5, measurement of the amount of fuel injection is performed sequentially at the second index Ixt=1, 2, so that the values of injection period correction amount df that eliminate differences from the standard amount of injection are stored in the memory of the measurement control device 72 by using the indexes "11, 12" on the allocation map (FIG. 13).

Then, after the process of storing the injection period correction amount df at the first index Ixp=5 and the second index Ixt=2(S316), it is determined whether at the same pressure value, the next second index Ixt provides a new injection period with reference to the injection period data array (FIG. 8) (S318). Since the injection period "650 μs" at the second index Ixt=3 equals the injection period provided at the second index Ixt=2, it is determined that a new injection period is absent ("YES" at S318).

Subsequently, it is determined whether a new pressure value is absent with reference to the pressure data array (FIG. 7) (S320). The next first index Ixp=6 provides "160 MPa", which is equal to the pressure value provided at the first index Ixp=5. Therefore, it is determined that a new pressure value is absent ("YES" at S320).

After that, the 12 values of injection period correction amount df stored with the indexes "1 to 12" acquired from the allocation map (FIG. 13) are arranged into a two-dimensional code together with the model data of the fuel injection valve 4, and are then transmitted as print data to the two-dimensional code printer 74 (S322). As a result, the data is printed out in the form of the two-dimensional code 62 by the two-dimensional code printer 74.

Thus, the injection correction amount map formation-purpose two-dimensional code forming process (FIGS. 20, 21) is completed. Then, the operator takes the measurement-object fuel injection valve 4 out of the injection amount measuring machine 70, and attaches thereto the two-dimensional code 62 output from the two-dimensional code printer 74. The above-described operation is performed on the individual fuel injection valves 4 to form two-dimensional codes 62 indicating variations in the amount of injection of the valves and attach the two-dimensional codes 62 to the corresponding fuel injection valves 4.

In this manner, injection correction amount array data as shown in FIG. 11 in conjunction with the first embodiment is prepared in the two-dimensional codes 62. Therefore, when the fuel injection valves 4 provided with the two-dimensional codes 62 are mounted on a diesel engine, data is read from the two-dimensional code 62 of each fuel injection valve 4, and is allocated in a memory of an engine-controlling ECU with reference to the allocation map (FIG. 13). As a result, the injection correction amount maps (FIGS. 3 to 6) corresponding to variations in the amount of fuel injection of the individual fuel injection valves 4 are completed in the engine-controlling ECU.

In the above-described construction, the injection correction amount maps of FIGS. 3 to 6 correspond to a data map, and the injection period correction amount df corresponds to map formation-purpose data, and the pressure data array of FIG. 7 and the injection period data array of FIG. 8 correspond to measurement point information. Furthermore, the memory of the measurement control device 72 storing the data arrays of FIGS. 7 and 8 corresponds to measurement point information storage means, and the injection amount measuring machine 70 corresponds to measurement means, and the allocation map of FIG. 13 corresponds to arrayal information, and the memory of the measurement control device 72 storing the allocation map of FIG. 13 corresponds to arrayal information storage means. Still further, the injection correction amount map formation-purpose two-dimensional code forming process (FIGS. 20 and 21) corresponds to a process as measurement means, map formation-purpose data setting means, and map formation-purpose data record means.

The second embodiment described above achieves the following advantages.

The pressure data array of FIG. 7 and the injection period data array of FIG. 8 are set corresponding to the kind of the fuel injection valves 4 to which the injection correction amount maps of FIGS. 3 to 6 are applied. Therefore, measurement points can be freely set in accordance with the kind of the fuel injection valves 4. Hence, even though the injection correction amount maps to be formed vary in terms of the region where data is needed at high density and the region where data is needed merely at low density depending on the kinds of fuel injection valves 4, the injection correction amount measuring apparatus of this embodiment is able to accomplish a desired task through measurement at a relatively small number of measurement points. Specifically, the apparatus is able to provide injection correction amount maps that highly precisely correspond to variations in the amount of injection of various fuel injection valves while adopting only 12 measurement points.

Therefore, since only a small number of values of injection period correction amount df need to be determined via measurement on the fuel injection valves 4, the injection correction amount measuring apparatus of this embodiment is capable of efficient measurement.

Furthermore, as for the two-dimensional codes 62, only a small amount of data needs to be recorded in accordance with the arrayal information of the allocation map of FIG. 13. The use of the thus-recorded two-dimensional codes 62 makes it possible to form injection correction amount maps in which data is arranged with the distribution of density corresponding to the kinds of fuel injection valves 4 while requiring only a small amount of data. Thus, it becomes possible to use high-precision injection correction amount maps separately for individual kinds of fuel injection valves 4.

[Third Embodiment]

Described with reference to this embodiment will be a correction point data forming process of forming the injection period data array (FIG. 8) and the allocation map (FIG. 13) used in the first and second embodiments. This correction point data forming process is executed by changing the program that functions in the measurement control device 72 through the use of the system construction shown in FIG. 19 in conjunction with the second embodiment.

For use in the correction point forming process, a pressure data array (FIG. 7) is set beforehand by equaling dividing the fuel pressure range where the actual fuel injection valve 4s are used. Furthermore, corresponding to the pressure values in FIG. 7, an injection period data array (μs) as shown in FIG. 22 is set beforehand. The injection period data array (μs) of FIG. 22 shows the injection periods as correction candidate points with respect to each pressure value. That is, in the injection period data array, correction candidate points are distributed in the entire range of injection period for actual injection at each pressure value. In this case, 10 correction candidate points are set from a lower-limit injection period to a higher-limit injection period in each injection period range.

Figure 23:
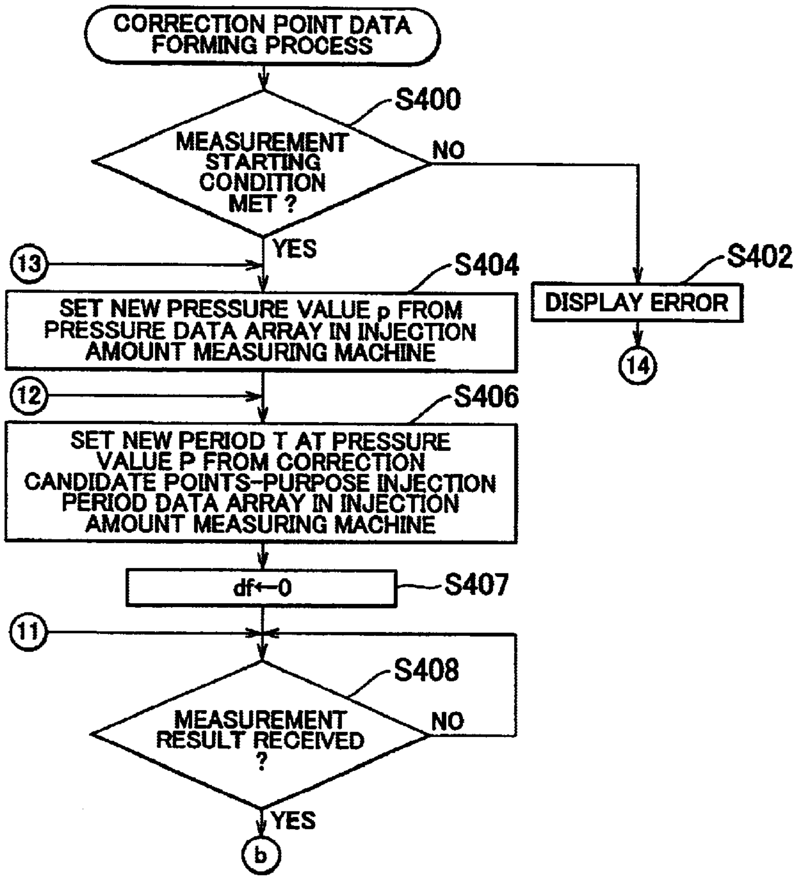
FIG. 23 is a flowchart illustrating a correction point data forming process executed by a measurement control device in the third embodiment.
Figure 24:
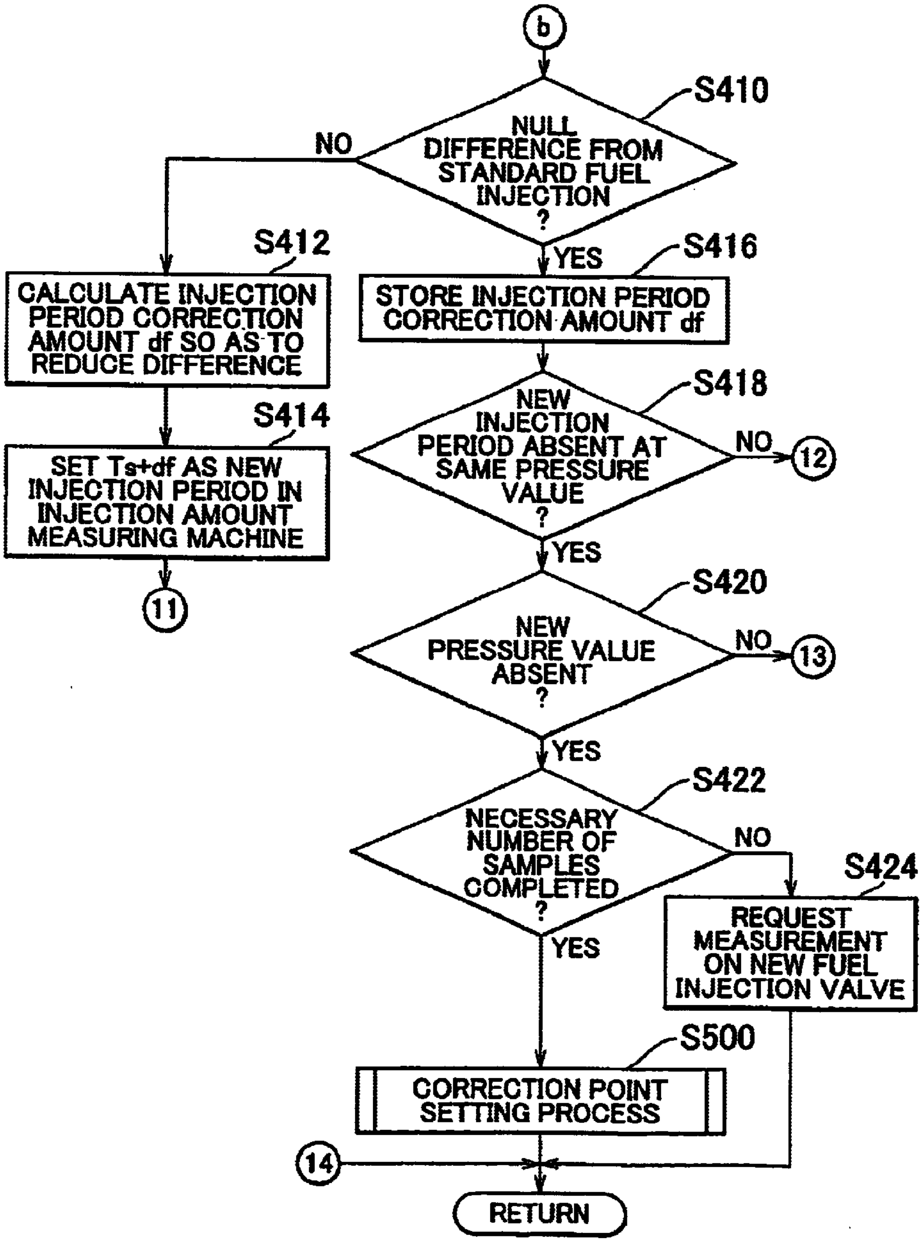
FIG. 24 is a flowchart illustrating the correction point data forming process.

A correction point data forming process executed by the measurement control device 72 is illustrated in FIGS. 23 and 24.

When the process starts, it is determined whether a measurement starting condition is met (S400). For examples, the measurement starting condition regarding the injection amount measuring machine 70 includes a state where the fuel injection valve 4 is properly disposed, a state where fuel exists, and a state where a pressurizing pump and other mechanisms are normal. Regarding the measurement control device 72, the measurement starting condition includes a state where the measurement-purpose data is being input via the data reader portion 72*b* or from the host computer, a state where such measurement-purpose data is inputtable, etc. Examples of the measurement-purpose data include data of the pressure data array (FIG. 7) as described above in conjunction with the first embodiment, the correction candidate points-purpose injection period data array that shows injection periods corresponding to each pressure value provided in the pressure data array as indicated in FIG. 22.

If any one of the measurement starting conditions is unmet ("NO" at S400), measurement cannot be started. Therefore, an error indication that indicates a cause of measurement failure is produced in the display portion 72*c* (S402), and then the process temporarily ends.

If all the measurement starting conditions are met ("YES" at S400), a new pressure value P from the pressure data array (FIG. 7) is set on the side of the injection amount measuring machine 70 (S404). Since this is the first setting operation, the pressure value "32 MPa" at the first index Ixp=1 in the pressure data array (FIG. 7) is set on the side of the injection amount measuring machine 70. Therefore, on the side of the injection amount measuring machine 70, the pressure of fuel supplied to the fuel injection valve 4 is adjusted to "32 MPa".

A new injection period T at the pressure value "32 MPa" (the first index Ixp=1) is extracted from the correction candidate points-purpose injection period data array (FIG. 22), and is set on the side of the injection amount measuring machine 70 (S406). Since this is the first extraction of the injection period at the first index Ixp=1, the injection period "540 μs" at the second index Ixt=1 is set on the side of the injection amount measuring machine 70. Therefore, on the side of the injection amount measuring machine 70, the open valve period of the fuel injection valve 4 is set at the injection period "540 μs", and the fuel injection from the fuel injection valve 4 is performed. Then, the amount of fuel actually injected is measured, and is sent to the side of the measurement control device 72.

On the side of the measurement control device 72, the below-described injection period correction amount df is set at "0" (S407). Then, the measurement control device 72 waits to receive a result of measurement (S408). Upon reception of a result of measurement ("YES" at S408), it is determined whether the measured amount of fuel injection has a difference from, that is, is substantially equal to, a pre-set amount of fuel injection provided by a standard fuel injection valve under the same condition (pressure value= "32 MPa" and the injection period="540 μs") (S410). The determination regarding the presence/absence of such difference is performed as described above in conjunction with step S310 in FIG. 21.

If there is such a difference ("NO" at S410), the injection period correction amount df for correcting the injection period Ts is changed in such a direction as to reduce the difference (S412). As for the changing of the injection period correction amount df, gradual increase/decrease is performed as shown in step S312 in FIG. 21.

Then, a period obtained by adding the injection period correction amount df to the injection period T is set as a new injection period on the side of the injection amount measuring machine 70 (S414). Therefore, on the side of the injection amount measuring machine 70, the injection period "540 μs +df" is set as an open valve period of the fuel injection valve 4, and the fuel injection from the fuel injection valve 4 is performed. Then, the amount of fuel actually injected is measured, and is sent to the side of the measurement control device 72.

The measurement control device 72 returns to the mode of waiting to receive a result of measurement (S408). Upon reception of a result of measurement ("YES" at S408), it is determined whether the measured amount of fuel injection has a difference from or is substantially equal to the pre-set amount of fuel injection provided by the standard fuel injection valve under the same condition (the pressure value="32 MPa" and the injection period="540 μs") (S410).

If there still is a difference ("NO" at S410), the process of steps S412 and S414 is performed again to set an injection period changed for approach to the standard amount of fuel injection, on the side of the injection amount measuring machine 70. Then, the measurement control device 72 waits to receive a result of measurement (S408).

The process of changing and setting the injection period as described above is executed until there is no difference between the actual amount of injection and the standard amount of injection. When the actual amount of injection comes to have no difference from, that is, becomes equal to, the standard amount of injection ("YES" at S410), the injection period correction amount df is placed and stored in a memory of the measurement control device 72 on the basis of the first index Ixp and an injection period candidate index Kt.

Next, it is determined whether a new injection period is absent corresponding to the same pressure value and the next injection period candidate index Kt with reference to the correction candidate points-purpose injection period data array (FIG. 22) (S418). At "32 MPa" (the first index Ixp=1), the next injection period candidate index Kt=2 provides "660 μs" ("NO" at S418). Therefore, "660 μs" is set as a new injection period T on the side of the injection amount measuring machine 70 (S406).

After setting "0" as an injection period correction amount df (S407), the measurement control device 72 waits to receive a result of measurement (S408). Upon reception of a result of measurement ("YES" at S408), it is determined whether the measured amount of fuel injection has a difference from or is substantially equal to the pre-set amount of fuel injection provided by the standard fuel injection valve under the same condition (the pressure value="32 MPa" and the injection period="660 μs")(S410). If there is a difference ("NO" at S410), the measurement following the changing of the value of the injection period correction amount df is executed until the actual amount of injection has no difference from the standard amount of injection (S412, S414) as described above.

When the actual amount of injection becomes substantially equal to the standard amount of injection ("YES" at S410), the injection period correction amount df is placed and stored in the memory of the measurement control device 72 on the basis of the first index Ixp and the injection period candidate index Kt (S416).

Next, it is determined whether at the same first index Ixp, the next injection period candidate index Kt provides a new injection period, with reference to the correction candidate points-purpose injection period data array (FIG. 22) (S418). At the first index Ixp=1, the next injection period candidate index Kt=3 provides "780 μs" ("NO" at S418). Therefore, "780 μs" is provided as a new injection period T on the side of the injection amount measuring machine 70 (S406). Then, the process of steps S407 to S416 is executed as described above, so as to store the injection period correction amount df that eliminates the difference between the actual amount of injection and the standard amount of injection.

After that, the process of steps S407 to S416 is executed as long as a new injection period exists at the first index Ixp=1. Through this operation, the injection period correction amounts df that eliminate differences between the actual amounts of injection and the standard amounts of injection corresponding to "890 μs", "1010 μs", "1120 μs", "1240 μs", "1350 μs", "1470 μs", "1580 μs" are stored.

After storage of the injection period correction amount df at "1580 μs" corresponding to the injection period candidate index Kt=10 and the first index Ixp=1, a new injection period at the next injection period candidate index Kt for the first index Ixp=1 is absent ("YES" at S418). Then, it is determined whether a new pressure value is absent (S420). Since the next first index Ixp=2 provides a new pressure value "64 MPa" ("NO" at S420), the pressure value "64 MPa" is stored as a new pressure value P on the side of the injection amount measuring machine 70 (S404).

At "64 MPa" (first index Ixp=2), the injection period candidate index Kt=1 provides "480 μs", which is a new injection period. Therefore, "480 μs" is set as a new injection period T on the side of the injection amount measuring machine 70 (S406).

Then, the injection period correction amount df acquired by the process of steps S407 to S414 described above is stored in the memory of the measurement control device 72 (S416). With respect to the injection period candidate index Kt=2 to 10 at the first index Ixp=2, the respective injection period correction amounts df are stored through the process of steps S407 to S416.

Likewise, with respect to the injection period candidate index Kt=1 to k at the first index Ixp=3 to 5, the respective injection period correction amounts df are stored through the process of steps S407 to S416.

In this manner, 50 values of the injection period correction amount df are calculated and stored.

After completion of calculation and storage of the values of the injection period correction amount df at the injection period candidate index Kt=1 and the first index Ixp=5, a new injection period is absent and a new pressure value is absent ("YES" at S418, and "YES" at S420). Then, it is determined whether a needed number of samples have been completed (S422). For example, in a case where the measurement control device 72 is preset so that eight fuel injection valves 4 are used as measurement samples, a measurement request regarding a new fuel injection valve 4 is made on the display portion 72*c* (S422) if measurement has not been completed for the eight valves. Then, the process temporarily ends.

After that, if a new fuel injection valve 4 is placed in the injection amount measuring machine 70 and the measurement starting condition is met ("YES" at S400), measurement of the amount of injection is performed on the new fuel injection valve 4 by using the pressure data array (FIG. 7) and the correction candidate points-purpose injection period data array (FIG. 22). As a result, 50 new injection period correction amounts df are stored. In this manner, 50 injection period correction amounts df for an array of the first index Ixp=1 to 5 and the injection period candidate index Kt=1 to 10 are acquired with respect to each one of the eight fuel injection valves 4.

Figure 25:
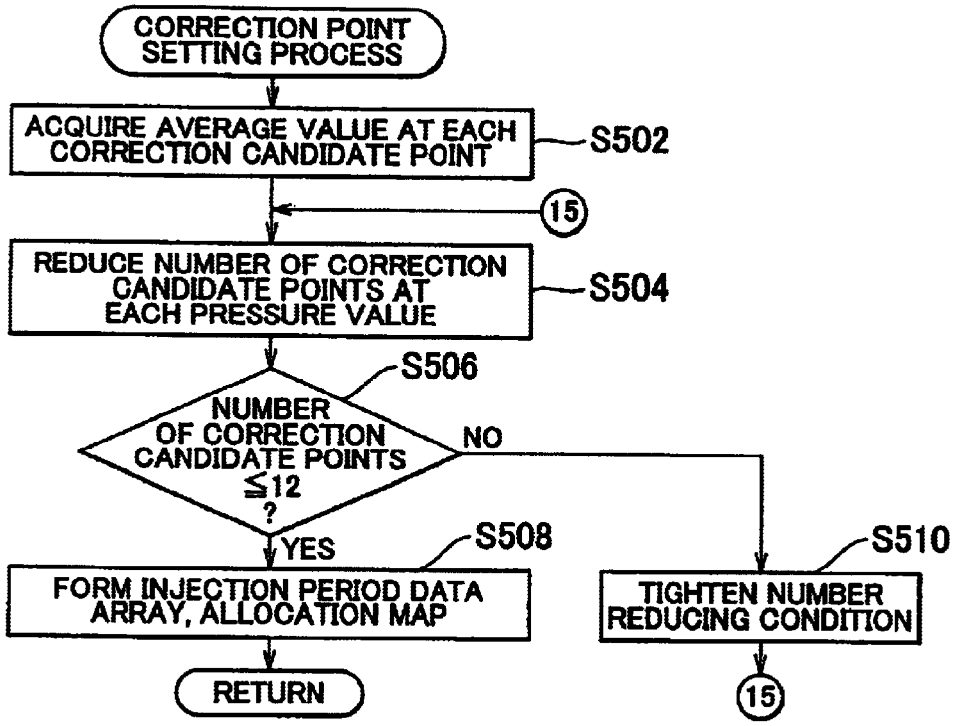
FIG. 25 is a flowchart illustrating the correction point data forming process.

After completion of the needed number of samples ("YES" at S422), a correction point setting process is executed using the injection period correction amount df (S500). The correction point setting process is illustrated in FIG. 25. In the process, an average value dfave of the eight injection period correction amounts df provided at each one of the 50 correction candidate points is calculated (S502).

The 10 correction candidate points present at each pressure value are reduced in number (S504). That is, in order to form an injection correction amount map, unnecessary correction candidate points are deleted. An example of this number reducing process is a process in which intermediate correction candidate points are deleted by a least-squares method.

Figure 26A:
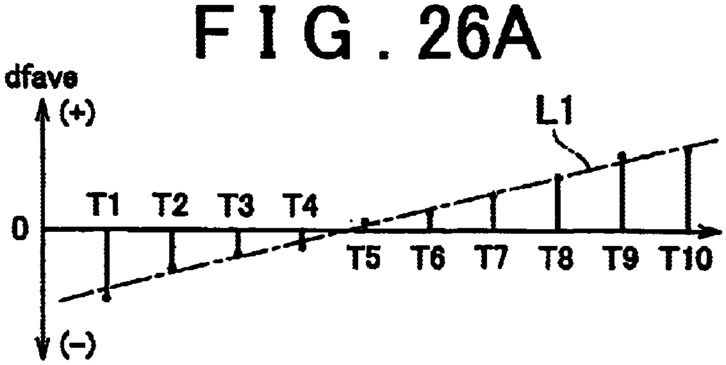
FIGS. 26A to 26D are diagrams illustrating a process of reducing the number of correction candidate points in the third embodiment.

Considered below as an example will be a case where a straight line L1 is determined by the least-squares method with respect to the injection period correction amount average values dfave regarding the injection periods T1 to T10 at the 10 correction candidate points as indicated in FIG. 26A. If the errors of the injection period correction amount average values dfave at the correction candidate points from the straight line L1 are within an allowable range, two points of the 10 correction candidate points, that is, the two end injection periods T1, T10, are adopted, and the other eight correction candidate points are excluded.

Figure 26B:
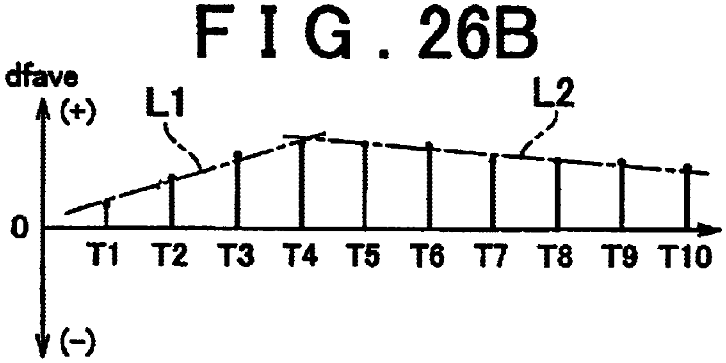

Furthermore, if such an error is not within the allowable range with only one straight line provided, two straight lines L1, L2 are determined, as indicated in FIG. 26B, by performing the least-squares method on two groups of correction candidate points divided at a certain correction candidate point (the injection period T4 in FIG. 26B). If in this case, the errors of the injection period correction amount average values dfave from the straight lines L1, L2 are within an allowable range, the two end points (injection periods T1, T10) and the boundary correction candidate point (the injection period T4) of the 10 correction candidate points are adopted, and the other seven correction candidate points are excluded.

Figure 26C:
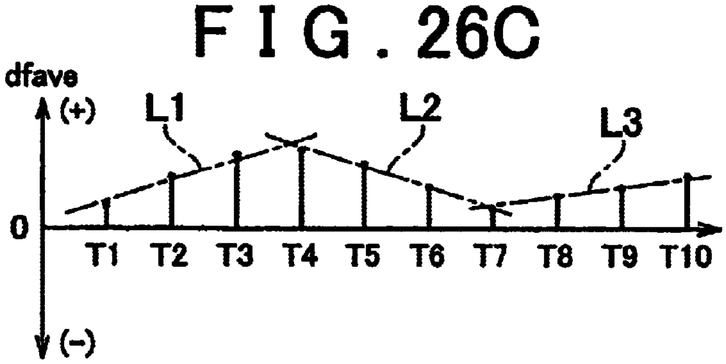

If such an error is not within the allowable range in the case of two straight lines, three straight lines L1, L2, L3 are determined by performing the least-squares on three groups of correction candidate points divided at two correction candidate points (the injection periods T4, T7 in FIG. 26C). If in this case, the errors of the injection period correction amount average values dfave from the straight lines L1, L2, L3 are within an allowable range, the two end points (injection periods T1, T10) and the boundary correction candidate points (the injection periods T4, T7) of the 10 correction candidate points are adopted, and the other six correction candidate points are excluded.

Figure 26D:
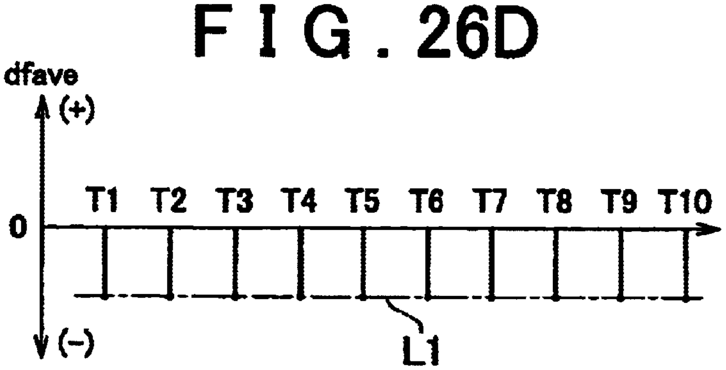

Furthermore, in a case where if the straight line L1 is determined by performing the least-squares method on the injection periods T1 to T10 at 10 correction candidate points as indicated in FIG. 26A, the errors of the injection period correction amount average values dfave at the correction candidate points from the straight line L1 are within the allowable range, the following process is also performed. That is, in a case where if the straight line L1 is parallel to the axis of the injection period T as indicated in FIG. 26D, the errors of the injection period correction amount average values dfave at the correction candidate points from the straight line L1 are still within the allowable range, one point of the 10 correction candidate points, for example, the correction candidate point of the longest injection period T10, is adopted, and the other nine correction candidate points are excluded.

After the above-described number reducing process (S504) is completed with respect to the first index Ixp=1 to 5, it is determined whether the total number of adopted correction candidate points is less than or equal to 12 (S506). If the number of adopted correction candidate points is less than or equal to 12 ("YES" at S506), the adopted correction candidate points are determined as correction points, and formation of an injection period data array and an allocation map is performed (S508).

For example, if the adopted correction candidate points are the injection period candidate index Kt=1, 10 at the first index Ixp=1, the injection period candidate index Kt=1, 4, 10 at the first index Ixp=2, the injection period candidate index Kt=1, 4, 10 at the first index Ixp=3, the injection period candidate index Kt=1, 10 at the first index Ixp=4, and the injection period candidate index Kt=1, 10 at the first index Ixp=5, the injection period data array shown in FIG. 8 (the portion other than the hatched portions in FIG. 8) in conjunction with the first embodiment is formed.

It should be noted herein that the hatched cells at the first index Ixp=1 to 5 in FIG. 8 are areas where values in the left adjacent cells are provided in order to indicate that the areas are not provided with data, and are not used. With regard to the first index Ixp=6, measurement is not executed, and therefore the array of the first index Ixp=5 is provided in order to indicate that the area is not used.

Then, the allocation map shown in FIG. 18 in conjunction with the first embodiment is formed by sequentially numbering the values of the injection period data array starting with the first index Ixp=1 and the injection period candidate index Kt=1. In FIG. 13, the hatched portions mean the same as in FIG. 8. Then, the process ends.

If the number of adopted correction candidate points is greater than 12 ("NO" at S506), the number reducing process is enhanced. That is, the enhanced process of reducing the number of correction candidate points at each pressure value (S504) is executed. In the enhanced number reducing process, the number of adopted correction candidate points is further reduced by, for example, enlarging the allowable range of errors of the injection period correction amount average values dfave from the straight line obtained by the least-squares method. Then, if the number of adopted correction candidate points becomes less than or equal to 12, the adopted correction candidate points are determined as correction points, and formation of an injection period data array and an allocation map is performed (S508). Then, the process ends.

Although FIGS. 8 and 13 show examples of arrays with 12 correction candidate points, the number of correction candidate points may be 10, 4 or the like depending on the kind of fuel injection valves.

In the above-described construction, the measurement points indicated by the pressure data array (FIG. 7) and the correction candidate points-purpose injection period data array (FIG. 22) correspond to standard measurement points, and the injection period correction amount average value dfave corresponds to a deviation of a measured value from a standard value. Furthermore, measurement of the amount of injection by the injection amount measuring machine 70 corresponds to measurement of a state of injection.

The above-described third embodiment achieves the following advantages.

By using the injection period data array (FIG. 8) and the allocation map (FIG. 13) formed separately for individual kinds of fuel injection valves in the second embodiment as described above, it is possible to form a two-dimensional code that allows formation of a fuel injection amount correction map in which the distribution of density of fuel injection correction amounts is arbitrarily changed corresponding to a kind of fuel injection valves given.

By using the thus-formed two-dimensional code in the first embodiment, it becomes possible to form high-precision fuel injection correction amount maps separately for individual kinds of fuel injection valves despite a small number of pieces of fuel injection correction amount data that is less than or equal to 12.

[Fourth Embodiment]

Figure 27:
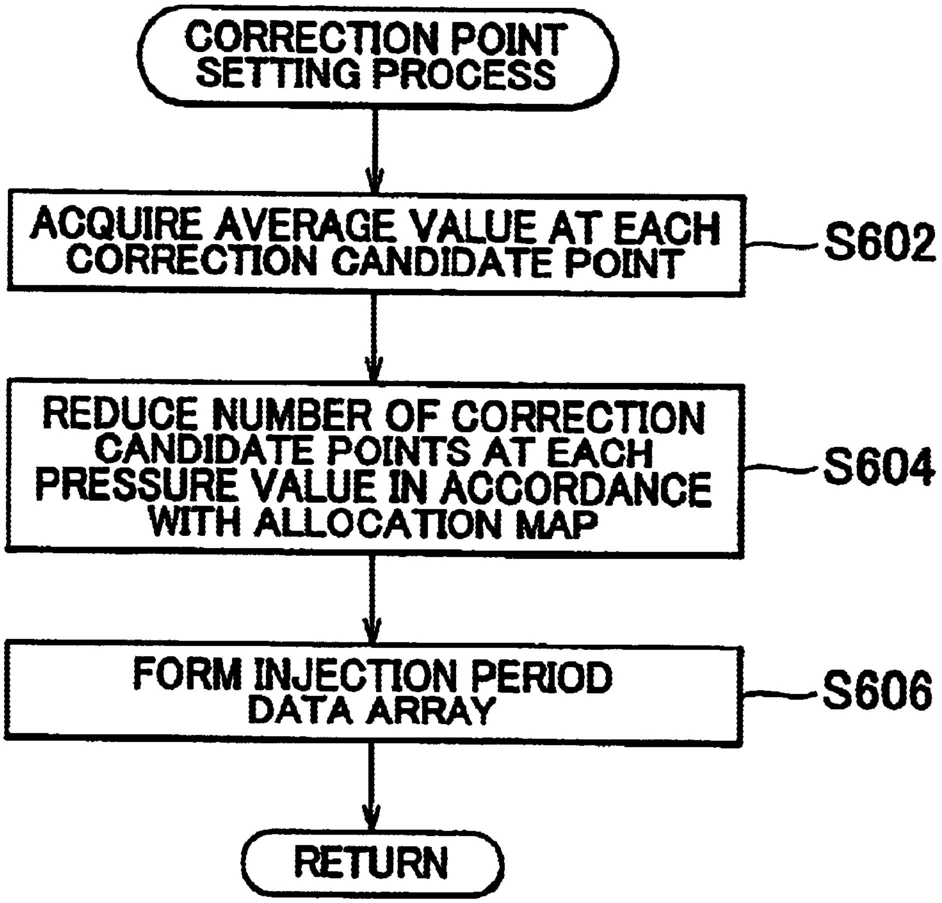
FIG. 27 is a flowchart illustrating a correction point-setting process executed by a measurement control device in a fourth embodiment.

This embodiment differs from the third embodiment in that an injection period data array (FIG. 8) as in the first and second embodiment is formed where the number of correction points is set in an allocation map. Therefore, a correction point setting process illustrated in FIG. 27 is executed instead of the correction point setting process (FIG. 25) described in conjunction with the third embodiment.

The correction point setting process (FIG. 27) will be described below. First, an injection period correction amount average value dfave of the injection period correction amounts at each one of the 50 correction candidate points is calculated (S602) as described above in conjunction with step S502 in FIG. 25.

Subsequently, the number of correction candidate points is reduced in accordance with the pre-set allocation map, and correction points are set (S604). For example, let it assumed that an allocation map as indicated in FIG. 15 has already been set by an operating person on the basis of data about eight fuel injection valves 4 measured in the correction point data forming process (FIGS. 23 and 24). In the allocation map of FIG. 15, four correction points are set corresponding to the first index Ixp=1. For example, the injection periods T1 to T10 of correction candidate points are divided into 3 regions by selecting two intermediate correction candidate points except for the two end-point injection periods T1 and T10. Then, the least-squares method is performed with respect to each region in a manner similar to that described in conjunction with the third embodiment, and two intermediate points that provide the least total of square errors are selected. Then, the four points, that is, the selected two intermediate two points and the two end injection periods T1, T10, are set as correction points at the first index Ixp=1.

At the first index Ixp=2, three correction points are to be set. Therefore, the correction candidate points are divided into two regions by selecting an intermediate point while excluding the two end injection periods T1, T10. Then, the least-squares method is performed with respect to each region, and one intermediate point that provides the least total of square errors is selected. Then, the three points, that is, the intermediate point and the two end injection periods T1, T10, are set as correction points.

At the first index Ixp=3, 4, two correction points are to be set, and therefore, the two end injection periods T1, T10 are set as correction points.

At the first index Ixp=5, one correction point is to be set, and therefore, one of the two end injection periods T1, T10, for example, the injection period T10, is set as a correction point. In another possible example, among the injection periods T1 to T10, a correction candidate point that is the closest to the straight line obtained by the least-squares method is set as a correction point.

After the correction points are determined for the individual pressure values, the injection periods at the correction points are extracted, and are arranged in accordance with the allocation map. Therefore, for example, an injection period data array as indicated in FIG. 14 is formed (S606).

The above-described fourth embodiment achieves the following advantages.

By using the pre-set allocation map and the injection period data array formed separately for individual kinds of fuel injection valves in the second embodiment as described above, it is possible to form a two-dimensional code that allows formation of a fuel injection amount correction map in which the distribution of density of fuel injection correction amounts is arbitrarily changed corresponding to a kind of fuel injection valves given.

By using the thus-formed two-dimensional code in the first embodiment, it becomes possible to form high-precision fuel injection correction amount maps separately for individual kinds of fuel injection valves despite a small number of pieces of fuel injection correction amount data that is less than or equal to 12.

Furthermore, at the time of forming an allocation map, an operation is allowed to change the density of correction points of the allocation map, factoring in the performance requirements of the diesel engine to which the embodiment is applied. Therefore, despite the small number of pieces of fuel injection correction amount data that is 12 or less, it becomes possible to form and use a high-precision fuel injection correction amount map that factors in the characteristics of the fuel injection valves and other requirements.

[Other Embodiments]

(a). The information record medium is not limited to a two-dimensional code, but may also be a bar code or the like. It is also possible to use an information record medium capable of recording many pieces of data. In any case, the amount of data that needs to be recorded is small, so that a measurement process for forming injection correction amount data to be recorded on the information record medium can be performed quickly, and the injection correction amount map formed by the injection correction amount data read from the information record medium may be small in size. Hence, a small memory is sufficient.

(b). Although in the interpolation calculation in conjunction with the injection correction amount map in the first embodiment, linear interpolation calculation is performed, it is also possible to perform an interpolation calculation combining the weighting on the correction points as well.

(c). In the first and second embodiments, the employment of the third and fourth embodiments may be omitted. That is, in possible modifications of the first and second embodiments, an operating person determines empirically and sets appropriate correction points, and forms a pressure data array (e.g., FIG. 7), an injection period data array (e.g., FIG. 8), and an allocation map (e.g., FIG. 13) for use. In this case, the density of correction points based on the allocation map can be changed, factoring in the performance requirements of a diesel engine to which the embodiments are applied. Therefore, despite a small number of pieces of fuel injection correction amount data that is 12 or less, it becomes possible to form and use a high-precision fuel injection correction amount map that factors in the characteristics of the fuel injection valves and other requirements.

(d). Although in the fourth embodiment, the number of correction points at each pressure value is determined beforehand, it is also possible to pre-determine the number of correction points corresponding to only one or more of the pressure values, and calculate the number of correction points corresponding to the other pressure values by using an apparatus as described above in conjunction with the third embodiment. In this case, too, if the number of correction points is greater than 12, the number reducing condition is tightened, and a similar process of reducing the number of correction points is repeated.

(e). The foregoing embodiments relate to formation of an injection correction amount map that indicates the injection characteristic of the fuel injection valves of a diesel engine. However, the invention is also applicable to formation of an injection correction amount map that indicates the injection characteristic of the fuel injection valves of a gasoline engine of a direct fuel injection type, an intake port fuel injection type, etc. Furthermore, the diesel engine is not limited to a common rail type engine. That is, the invention is also applicable to formation of an injection correction amount map that indicates the injection characteristic of each cylinder of a diesel engine equipped with a different type of injection system.

The invention is applicable to devices other than fuel injection valves. For example, the invention is applicable to formation of a degree-of-opening correction amount map, a measurement output correction amount map, and the like in the control of the degree of opening of an EGR valve or the like, the control of the degree of opening of a throttle valve, the measurement by various sensors, etc.

(f). Although the fuel injection amount control process of FIG. 2 is performed on a diesel engine that conducts the pilot injection and the main injection, the invention is also applicable to a case where only the main injection is performed. Furthermore, in a case where the main injection is followed by an after-injection of injecting fuel during the expansion stroke or the exhaust stroke, the injection correction amount maps of FIGS. 3 to 6 are applicable to correction of the injection period of the after-injection similarly to the injection period correction of the pilot injection and the main injection.

What is claimed is:

1. A method of forming a data map, comprising the steps of:

reading data from an information record medium that records map formation-purpose data; and allocating the data in a map, wherein a state of allocation of the map formation-purpose data recorded in the information record medium is made changeable in accordance with a kind of a mechanism to which the data map is applied, by allocating the map formation-purpose data recorded in the information record medium based on allocation information that is set corresponding to the kind of the mechanism, and wherein the mechanism is a fuel injection valve of a diesel engine, and the data map is a fuel injection correction amount map comprising at least two parameters including a fuel pressure and an injection period.

2. The method according to claim 1, wherein the information record medium is a two-dimensional code.

3. The method according to claim 1, wherein the information record medium records a fuel injection correction amount, and wherein the allocation information is caused to correspond to the kind of the mechanism by changing the number of constituent points of one parameter of the fuel pressure and the injection period which need allocation of the fuel injection correction amount at each constituent point of the other parameter.

4. The method according to claim 3, wherein the allocation information sets, as a position of allocation of the fuel injection correction amount, a standard measurement point selected based on a pattern of a deviation between a standard value and a measured value obtained by measuring a state of injection at pre-set standard points specifically to the kind of the fuel injection valve.

5. An apparatus for forming a data map by reading data from an information record medium that records map formation-purpose data, and allocating the data in a map, the apparatus comprising:

medium data reading device that reads the map formation-purpose data recorded in the information record medium;

an allocation information storage device that stores allocation information that is set corresponding to a kind of a mechanism to which the data map is applied; and data allocation device that forms the data map corresponding to the kind of the mechanism by allocating map formation-purpose data read by the medium data reading device based on the allocation information stored in the allocation information storage device, wherein the mechanism is a fuel injection valve of a diesel engine, and the data map is a fuel injection correction amount map comprising at least two parameters including a fuel pressure and an injection period.

6. The apparatus according to claim 5, wherein the information record medium is a two-dimensional code.

7. The apparatus according to claim 5, wherein the information record medium records a fuel injection correction amount, and wherein the allocation information stored in the allocation information storage device is caused to correspond to the kind of the mechanism due to a construction in which the number of constituent points of one parameter of the fuel pressure and the injection period which need allocation of the fuel injection correction amount at each constituent point of the other parameter is changed.

8. The apparatus according to claim 7, wherein the allocation information stored in the allocation information storage device is obtained by using, as a position of allocation of the fuel injection correction amount, a standard measurement point selected based on a pattern of a deviation between a standard value and a measured value obtained by measuring a state of injection at pre-set standard points specifically to the kind of the fuel injection valve.

9. A method of recording data for forming a data map for managing operation of a mechanism into an information record medium, comprising the steps of: measuring a state of operation of a mechanism at measurement points based on measurement point information that is set corresponding to a kind of the mechanism to which the data map is applied;

setting map formation-purpose data based on a result of measurement of the state of operation; and recording the map formation-purpose data in the information record medium in an array based on arrayal information that sets a relationship between the measurement points and a data array, wherein the mechanism is a fuel injection valve of a diesel engine, and the data map is a fuel injection correction amount map comprising at least two parameters including a fuel pressure and an injection period.

10. The method according to claim 9, wherein the information record medium is a two-dimensional code.

11. The method according to claim 9, wherein the measurement point information sets measurement points corresponding to the kind of the mechanism by changing the number of constituent points of one parameter of the fuel pressure and the injection period which need the measurement at each constituent point of the other parameter.

12. The method according to claim 11, wherein the measurement point information sets, as the measurement points, standard measurement points selected based on a pattern of a deviation between a standard value and a measured value obtained by measuring a state of injection at pre-set standard points specifically to the kind of the fuel injection valve.

13. An apparatus for recording data for forming a data map for managing operation of a mechanism into an information record medium, the apparatus comprising:

a measurement point information storage device that stores measurement point information that is set corresponding to a kind of a mechanism to which the data map is applied;

a measurement device that measures a state of operation of the mechanism at measurement points based on the measurement point information stored in the measurement point information storage device;

map formation-purpose data setting device that sets map formation-purpose data based on measurement by the measurement device; and an arrayal information storage device that stores arrayal information that sets a relationship between the measurement points based on the measurement point information stored in the measurement point information storage device and a data array of the map formation-purpose data set by the map formation-purpose data setting device, wherein the mechanism is a fuel injection valve of a diesel engine, and the data map is a fuel injection correction amount map comprising at least two parameters including a fuel pressure and an injection period.

14. The apparatus according to claim 13, wherein the information record medium is a two-dimensional code.

15. The apparatus according to claim 13, wherein the measurement point information stored in the measurement point information storage device is caused to correspond to the kind of the mechanism due to a construction in which the number of constituent points of one parameter of the fuel pressure and the injection period which need the measurement at each constituent point of the other parameter is changed.

16. The apparatus according to claim 15, wherein the measurement point information stored in the measurement point information storage device sets, as the measurement points, standard measurement points selected based on a pattern of a deviation between a standard value and a measured value obtained by measuring a state of injection at pre-set standard points specifically to the kind of the fuel injection valve.

* * * * *